United States Patent
Kobayashi

(10) Patent No.: US 12,286,491 B2
(45) Date of Patent: Apr. 29, 2025

(54) IMAGE FORMING DEVICE AND IMAGE FORMING METHOD

(71) Applicant: Masahide Kobayashi, Kanagawa (JP)

(72) Inventor: Masahide Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 505 days.

(21) Appl. No.: 17/669,404

(22) Filed: Feb. 11, 2022

(65) Prior Publication Data

US 2022/0259338 A1 Aug. 18, 2022

(30) Foreign Application Priority Data

Feb. 18, 2021 (JP) .................... 2021-024545

(51) Int. Cl.
*C08F 20/56* (2006.01)
*A45D 29/11* (2006.01)
(Continued)

(52) U.S. Cl.
CPC .............. *C08F 20/56* (2013.01); *A45D 29/11* (2013.01); *B41J 2/2107* (2013.01); *B41J 3/543* (2013.01); *B41J 11/00212* (2021.01); *B41J 11/00214* (2021.01); *B41J 11/007* (2013.01); *B41J 11/009* (2013.01); *A45D 2029/005* (2013.01)

(58) Field of Classification Search
CPC .......... A45D 29/00; A45D 29/22; B05C 9/04; B41J 2/01; B41J 3/407; B41J 11/00214; C09D 11/00; C09D 11/107; C09D 11/101; C09D 11/30; C09D 11/40; C09D 11/322; B41M 5/0023
See application file for complete search history.

(56) References Cited

U.S. PATENT DOCUMENTS

2004/0189772 A1* 9/2004 Arai .................. B41J 11/00212
 347/102
2007/0138411 A1* 6/2007 Konarski ............. C09D 133/26
 250/492.1
(Continued)

FOREIGN PATENT DOCUMENTS

| JP | 10-114810 | 5/1998 |
|---|---|---|
| JP | 2002-225415 | 8/2002 |

(Continued)

OTHER PUBLICATIONS

Japanese Office Action received for Japanese Patent Application No. 2021-024545, mailed on Sep. 17, 2024, 8 pages with English translation.

*Primary Examiner* — John Zimmermann
(74) *Attorney, Agent, or Firm* — Grüneberg and Myers PLLC

(57) ABSTRACT

An image forming device includes a first discharging device configured to discharge a first active energy curing composition (1) containing a first (meth)acrylic amide compound (A) having a (meth)acrylic group and a first polymerization initiator (C) to a medium, a first exposing device configured to expose the first active energy curing composition (1) applied to the medium to first active energy, and a second discharging device configured to discharge an ink (2) containing a coloring material, a water-soluble organic solvent, and water to the first active energy curing composition (1) exposed to the first active energy.

19 Claims, 4 Drawing Sheets

(51) Int. Cl.
*B41J 2/21* (2006.01)
*B41J 3/54* (2006.01)
*B41J 11/00* (2006.01)
*A45D 29/00* (2006.01)

(56) References Cited

U.S. PATENT DOCUMENTS

| | | | |
|---|---|---|---|
| 2008/0184930 A1* | 8/2008 | Furukawa | B41J 11/0015 118/46 |
| 2008/0186352 A1* | 8/2008 | Sasayama | B41J 2/16585 347/30 |
| 2008/0239043 A1* | 10/2008 | Nakazawa | B41J 11/0021 347/42 |
| 2011/0109673 A1* | 5/2011 | Usuda | B41J 29/393 347/9 |
| 2011/0234680 A1* | 9/2011 | Aoyama | C09D 11/40 522/64 |
| 2014/0011941 A1* | 1/2014 | Anton | C09D 11/324 524/505 |
| 2015/0374092 A1* | 12/2015 | Bitoh | A45D 29/00 132/200 |
| 2017/0009091 A1* | 1/2017 | Herlihy | C09D 11/103 |
| 2017/0215550 A1* | 8/2017 | Walia | A45D 44/005 |
| 2020/0031969 A1 | 1/2020 | Kobayashi et al. | |
| 2021/0061929 A1 | 3/2021 | Kobayashi et al. | |
| 2021/0120935 A1* | 4/2021 | Shashou | B25J 9/026 |
| 2021/0122938 A1 | 4/2021 | Kobayashi et al. | |

FOREIGN PATENT DOCUMENTS

| | | |
|---|---|---|
| JP | 2002-332433 | 11/2002 |
| JP | 2004-330568 | 11/2004 |
| JP | 2006-188035 | 7/2006 |
| JP | 2007-054983 | 3/2007 |
| JP | 2007-276387 | 10/2007 |
| JP | 2010-105187 | 5/2010 |
| JP | 2010-115854 | 5/2010 |
| JP | 2015-136884 | 7/2015 |
| JP | 2020-093532 | 6/2020 |

* cited by examiner

IMAGE FORMING DEVICE AND IMAGE FORMING METHOD

CROSS-REFERENCE TO RELATED APPLICATIONS

This patent application is based on and claims priority pursuant to 35 U.S.C. § 119 to Japanese Patent Application No. 2021-024545, filed on Feb. 18, 2021 in the Japan Patent Office, the entire disclosure of which is hereby incorporated by reference herein.

BACKGROUND

Technical Field

The present disclosure relates to an image forming device and an image forming method.

Description of the Related Art

Image forming methods utilizing inkjet printing have been widely used because it can form color images on plain paper with low running costs.

However, typical inkjet printing is likely to suffer a problem of image deficiency such as text blur, hereinafter referred to as feathering, depending on the combination of ink and printing media. It also has a great beading problem of degrading the image quality in a combinational use of aqueous ink and media that never or little absorb the aqueous ink such as offset printing paper and polyethylene terephthalate (PET) film.

In addition, since color images are formed with color inks having different colors by inkjet printing, the color inks blur or mix at color boundaries, hereinafter referred to as color bleed, which degrades the image quality.

In an attempt to solve this problem and enhance the image quality, image forming methods using a processing fluid and ink have been proposed. They include a method of discharging a processing fluid from a head, a method of spraying a processing fluid with an air pressure, and a method of uniformly applying a processing fluid by controlling the pressure of an application roller and a facing roller to uniformly apply the fluid.

SUMMARY

According to embodiments of the present disclosure, an image forming device is provided which includes a first discharging device configured to discharge a first active energy curing composition (1) containing a first (meth) acrylic amide compound (A) having a (meth)acrylic group and a first polymerization initiator (C) to a medium, a first exposing device configured to expose the first active energy curing composition (1) applied to the medium to first active energy, and a second discharging device configured to discharge an ink (2) containing a coloring material, a water-soluble organic solvent, and water to the first active energy curing composition (1) exposed to the first active energy.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
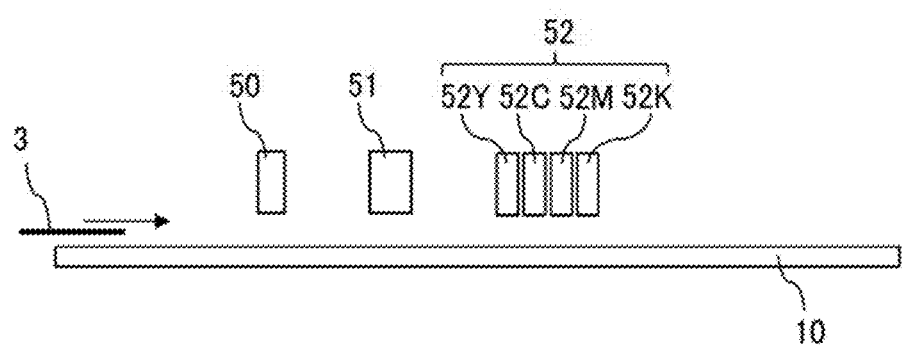
FIG. 1 is a schematic diagram illustrating an example of an image forming device according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an." and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, an image forming device is provided which can form an image having excellent beading quality, abrasion resistance, and hardness.

Hereinafter, the image forming device and the image forming method of the present disclosure are described with reference to the accompanying drawings.

It is to be noted that the following embodiments are not limiting the present disclosure and any deletion, addition, modification, change, etc. can be made within a scope in which man in the art can conceive including other embodiments, and any of which is included within the scope of the present disclosure as long as the effect and feature of the present disclosure are demonstrated.

First Embodiment

The image forming device of the present embodiment includes a first discharging device for discharging a first active energy curing composition (1) containing a (meth) acrylic amide compound (A) having a (meth)acrylic group and a polymerization initiator (C) to a medium, a first exposing device for exposing the first active energy curing composition (1) applied to the medium to first active energy, and a second discharging device configured to discharge an ink (2) containing a coloring material, a water-soluble organic solvent, and water to the first active energy curing composition (1) exposed to the first active energy.

The image forming method includes discharging a first active energy curing composition (1) containing a (meth) acrylic amide compound (A) having a (meth)acrylic group and a polymerization initiator (C) to a medium, exposing the first active energy curing composition (1) applied to the medium to first active energy, and discharging an ink (2) containing a coloring material, a water-soluble organic solvent, and water to the first active energy curing composition (1) exposed to the first active energy.

Images formed with the image forming device and the image forming method of the present embodiment are not particularly limited and include two or three dimensional images. The image forming device is also referred to as a two or three dimensional image forming device and the image forming method is also referred to as a two or three dimensional image forming method.

The image forming device of the present embodiment optionally furthermore includes a conveying device for conveying the medium. The first discharging device, the first exposing device, and the second discharging device are disposed in this order in the image forming device from upstream to downstream along the conveyance direction of the medium.

Generally, oil-based ink has been used for media that never or little absorb aqueous ink such as offset printing paper and polyethylene terephthalate (PET) film. However, the use of such ink is likely to be limited in terms of resource saving and safeness. Printing with aqueous ink is appealing to achieve energy-saving. The market is in favor of on-demand printing using inkjet printing in particular for small lot printing. Non-absorptive media such as general-purpose offset printing paper and PET film never or little absorb aqueous ink because they are specialized for oil-based ink. Aqueous ink thus does not evenly cover a medium but blur on the medium. This combination significantly degrades the beading quality, image drying property immediately after printing, and fixability in high speed one-pass printing.

According to the present disclosure, images having excellent beading quality, abrasion resistance, and hardness can be formed. Images having excellent beading quality, abrasion resistance, and hardness can be formed when printed on media by inkjetting, even on offset printing paper with aqueous ink, and even more when printed in high performance one pass printing by a high performance inkjet printer.

First Discharging Device and First Discharging

The first discharging device discharges the first active energy curing composition (1) to a medium. The first discharging device uses a part such as an inkjet head.

In the first discharging, the first active energy curing composition (1) is discharged to a medium.

First Active Energy Curing Composition (1)

The first active energy curing composition (1) contains a (meth)acrylamide compound (A) having a (meth)acrylic group, a polymerization initiator (C), and optional substances such as a first polyfunctional polymerizable compound or polymerizable oligomer (B) and a first hydrogen donor (D).

The first active energy curing composition (1) can be also referred to as an active energy curing pre-processing fluid or active energy curing base coating fluid. The first active energy curing composition (1) is hereinafter also referred to as simply the composition (1), the pre-processing fluid, or the base coating fluid.

First (Meth)acrylamide Compound (A) Having (Meth) acrylic Group

In the present embodiment, the first (meth)acrylamide compound (A) having (meth)acrylic group cures during polymerization reaction caused by a starting species such as a radical produced under the presence of the polymerization initiator described later. The first (meth)acrylamide compound (A) having (meth)acrylic group is also simply referred to as the first (meth)acrylamide compound (A).

Specific examples of the first (meth)acrylamide compound (A) include, but are not limited to, N-acryloylmorpholine, N,N-dimethyl (meth)acrylamide, N,N-diethyl (meth)acrylamide, N,N-isoprpopyl (meth)acrylamide, diisoprpopyl (meth)acrylamide, diacetone (meth)acrylamide, N-(2-hydroxyethyl) (meth)acrylamide, N-(hydroxymethyl) (meth)acrylamide, N-(butoxymethyl) (meth)acrylamide, N-[3-(dimethylamino)propyl](meth)acrylamide, N-(1,1-dimethyl-3-oxobutyl) (meth)acrylamide, and 2-(meth)acrylamide-2-methyl propane sulfonic acid. The (meth)acrylamide compound (A) can be procured.

The molecular weight of the first (meth)acrylamide compound (A) is preferably from 150 to 250. A molecular weight of 150 or more can minimize the odor caused by volatilization of the compound and enhance the inkjet discharging stability, which is preferable. A molecular weight of 250 or less enhances the curability of the composition, improves the strength of the cured matter, and moreover increases the viscosity of the composition.

The first (meth)acrylamide compound (A) having a (meth)acrylic group preferably contains a compound having an acrylamide group and a neutral ester structure with a moderate polarity. A first (meth)acrylamide compound (A) having a neutral ester structure with a moderate polarity enhances the effect of the present disclosure.

The first (meth)acrylic amide compound having a (meth) acrylic group and an ester structure is referred to as a (meth)acrylic acid ester. In the specification of the present disclosure, (meth)acrylic acid ester means an acrylic acid ester or a methacrylic acid ester, (Meth)acrylate means acrylate or methacrylate.

The first (meth)acrylamide compound (A) having a (meth)acrylic group preferably contains an acrylamide compound (A1) represented by the Chemical Formula (1) or Chemical Formula (2) below. This compound (A1) enhances the curability and attachability. The acrylamide compound (A1) represented by the Chemical Formula (1) or Chemical Formula (2) are simply referred to as the acrylamide compound (A1).

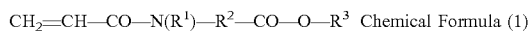
$CH_2=CH—CO—N(R^1)—R^2—CO—O—R^3$ Chemical Formula (1)

In Chemical Formula (1), $R^1$ represents a hydrogen atom or a linear or branched alkyl group having one to four carbon atoms, $R^2$ represents a linear or branched alkylene group having one to four carbon atoms, and $R^3$ represents a linear or branched alkyl group having one to four carbon atoms. The number of the carbon atoms in $R^1$, $R^2$, and $R^3$ is 2 to 6 in total.

Chemical Formula (2)

In Chemical Formula (2), the ring X represents a ring structure having a nitrogen atom and two to five carbon atoms, $R^4$ represents a single bond or a linear or branched alkylene group having one to three carbon atoms, $R^5$ represents a linear or branched alkyl group having one to three carbon atoms, where the number of the carbon atoms in the ring X, $R^4$, and $R^5$ is 3 to 6 in total.

Examples of the acrylamide (A1) include, but are not limited to, N-acryloyl-N-alkyl amino acid alkyl esters (including N-acryloyl proline alkyl esters) and N-acryloyl piperidine carboxylic acid alkyl esters.

The alkyl group referred to in this context means a linear or branched alkyl group having one to four carbon atoms and particularly preferably an alkyl group having one or two carbon atoms (that is, a methyl group or an ethyl group).

There is no specific limitation to the N-acryloyl-N-alkylamino acid alkyl ester mentioned above, which can be suitably selected to suit to a particular application.

Specific examples include, but are not limited to, N-acryloyl-N-methylglycine methyl ester, N-acryloyl-N-methylglycine ethyl ester. N-acryloyl-N-methylglycinepropyl esters, N-acryloyl-N-methylglycine butyl ester, N-acryloyl-N-ethylglycine methyl ester. N-acryloyl-N-ethylglycine ethyl ester, N-acryloyl-N-ethylglycine propyl ester, N-acryloyl-N-propylglycine methyl ester, N-acryloyl-N-propylglycine ethyl ester, N-acryloyl-N-butylglycine methyl ester, N-acryloyl-N-methylalanine methyl ester, N-acryloyl-N-methylalanine ethyl ester. N-acryloyl-N-methylalanine propyl ester, N-acryloyl-N-ethylalanine methyl ester, N-acryloyl-N-ethylalanine ethyl ester, N-acryloyl-N-propylalanine methyl ester. N-acryloyl-N-methyl-β-alanine methyl ester, N-acryloyl-N-methyl-β-alanine ethyl ester, N-acryloyl-N-ethyl-β-alanine methyl ester, N-acryloyl-N-ethyl-β-alanine ethyl ester, N-acryloyl-N-methylvaline methyl ester, N-acryloylproline methyl ester, and N-acryloylproline ethyl ester. These can be used alone or in combination.

The N-acryloyl piperidine carboxylic acid alkyl esters mentioned above is not particularly limited and can be suitably selected to suit to a particular application.

Specific examples include, but are not limited to, N-acryloyl piperidine-2-carboxylic acid methyl, N-acryloyl piperidine-3-carboxylic acid methyl, and N-acryloyl piperidine-4-carboxylic acid methyl. These can be used alone or in combination.

The first (meth)acrylamide compound (A) is preferably a colorless transparent or pale yellow transparent liquid having a low viscosity (100 mPa·s or less) at room temperature, 25 degrees C., for application to an inkjet printing method. In addition, it is preferable that the first (meth)acrylamide compound (A) do not have a strong acidity or basicity and be free of harmful formaldehyde as impurities for safety of users.

The proportion of the first (meth)acrylamide compound (A) to the entire composition (1) is preferably from 10 to 80 percent by mass, more preferably from 20 to 70 percent by mass, and furthermore preferably from 30 to 60 percent by mass.

The proportion of the first acrylamide compound (A1) in the (meth)acrylic amide compound (A) is preferably 10 percent by mass or greater and more preferably 20 percent by mass or greater. The acrylamide compound (A1) may account for 100 percent in the first (meth)acrylamide compound (A).

Further, the mass ratio of the acrylamide compound (A1) to the first polymerization initiator (C) in the composition (1) is preferably from 5 to 25, more preferably from 8 to 20, and furthermore preferably from 9 to 19.

The first (meth)acrylamide compound (A) has no particular limitation about viscosity and can be suitably selected to suit to a particular application. The viscosity of the composition (1) is preferably from 10 to 300 mPa·s, more preferably from 10 to 200 mPa·s, and furthermore preferably from 10 to 20 mPa·s at 23 degrees C. as the composition (1) is discharged from an inkjet head. A viscosity less than 10 mPa·s may cause dripping from a discharging device and a viscosity greater than 300 mPa·s may result in uneven coverage of a medium by the composition (1).

First Polyfunctional Polymerizable Compound or Polymerizable Oligomer (B)

The composition (1) preferably contains a first polyfunctional compound or polymerizable oligomer (B). The first polyfunctional compound or polymerizable oligomer (B) is not particularly limited as long as it is polymerized upon an application of active energy such as ultraviolet and electron beams. It can be suitably selected to suit to a particular application. The polyfunctional compound or polymerizable oligomer (B) can be selected to adjust the reaction speed, ink properties, and cured film properties. It can be used alone or in combination.

Examples include, but are not limited to, radically polymerizable compounds and polymerizable oligomers.

Specific examples of the radically polymerizable compound include, but are not limited to, (meth)acrylates, urethane acrylates, and polyester acrylates. These can be used alone or in combination. (Meth)acrylate means at least one of acrylate and methacrylate and (meta)acrylic means at least one of the acrylic and methacrylic.

Examples of the (meth)acrylate compound include, but are not limited to, bi-functional (meth)acrylates, tri-functional (meth)acrylates, tetrafunctional (meth)acrylates, pentafunctional (meth)acrylates, and hexafunctional (meth) acrylates. These can be used alone or in combination.

Specific examples of the bi-functional (meth)acrylates include, but are not limited to, 1,6-hexanediol di(meth) acrylate, 1,10-decanediol di(meth)acrylate, neopentylglycol di(meth)acrylate, 2,4-dimethyl-1,5-pentane diol di(meth) acrylate, butylethylpropane diol di(meth)acrylate, ethoxylated cyclohexanemethanol di(meth)acrylate, 2-ethyl2-butyl-butanediol di(meth)acrylate, hydroxy pivalic acid neopentylglycol di(meth)acrylate, bisphenol F polyethoxy di(meth)acrylate, 1,4-butanediol di(meth)acrylate, 2-ethyl-2-butylpropanediol di(meth)acrylate, 1,9-nonane di(meth) acrylate, propoxylated ethoxylated bisphenol A di(meth)

acrylate, and tricyclodecane di(meth)acrylate. These can be used alone or in combination.

Specific examples of the tri-functional (meta)acrylates include, but are not limited to, alkylene oxide-modified tri(meta)acrylate of trimethyrol propane tri(meta)acrylate, trimethylolethane tri(meta)acrylate, and trimethylolpropane, pentaerythritol tri(meta)acrylate, dipentaerythritol tri(meta)acrylate, trimethylol propane tri((meta)acryloyloxy propyl) ether, alkylene oxide-modified tri(meta)acrylate isocyanurate, dipentaerythritol tri(meta)acrylate propionate, tri(meth)acryloyloxyethyl isocyanulate, hydroxy pivalaldehyde-modified dimethylol propane tri(meth)acrylate, sorbitol tri(meth)acrylate, propoxylated trimethylol propane tri(meta)acrylate, and ethoxylated glycerin tri(meta)acrylate. These can be used alone or in combination.

Specific examples of the tetra-functional (meth)acrylates include, but are not limited to, sorbitol tetra(meth)acrylate, ditrimethylol propanetetra(meth)acrylate, and dipentaerythritol tetra(meth)acrylate propionate. These can be used alone or in combination.

A specific example of the penta-functional (meth)acrylates is sorbitol penta(meth)acrylate. These can be used alone or in combination.

Specific examples of the hexa-functional (meth)acrylates include, but are not limited to, dipentaerythritol hexa(meth)acrylate, sorbitol hexa(meth)acrylate, alkyleneoxide-modified hexa(meth)acrylate of phosphazene, and caprolactone-modified dipentaerythritol hexa(meth)acrylate. These can be used alone or in combination.

The polymerizable oligomer preferably has one or more ethylenyl unsaturated double bonds. Oligomer means a polymer having 2 to 20 repeating monomer structural units.

The weight average molecular weight of the polymerizable oligomer has no particular limit and can be suitably selected to suit to a particular application. It is preferably from 1,000 to 30,000 and preferably from 5,000 to 20,000 in polystyrene conversion. The weight average molecular weight can be measured by gel permeation chromatography (GPC).

Specific examples of the polymerizable oligomer include, but are not limited to, urethaneacrylate oligomers such as aromatic urethane acrylate oligomer and aliphatic urethane acrylate oligomer, epoxy acrylate oligomer, polyester acrylate oligomer, and other special oligomers. These can be used alone or in combination.

Of these oligomers, oligomers having 2 to 5 unsaturated carbon-carbon bond are preferable and oligomers having 2 unsaturated carbon-carbon bond are more preferable. Oligomers having 2 to 5 unsaturated carbon-carbon bonds have good curability.

The proportion of the urethane acrylate oligomer to the entire composition (1) is preferably 5 percent by mass or less to reduce viscosity.

The polymerizable oligomer can be procured.

Specific examples include, but are not limited to, UV-2000B, UV-2750B, UV-3000B, UV-3010B, UV-3200B, UV-32000B, and UV-3300B, UV-3700B, UV-6640B, UV-8630B, UV-7000B, UV-7610B, UV-1700B, UV-7630B. UV-6300B, UV-6640B, UV-7550B, UV-7600B, UV-7605B, UV-7610B, UV-7630B, UV-7640B, UV-7650B, UT-5449, and UT-5454 (all manufactured by The Nippon Synthetic Chemical Industry Co., Ltd.), CN902, CN902J75, CN929. CN940, CN944, CN944B85, CN959, CN961E75, CN961H81, CN962, CN963, CN963A80, CN963B80. CN963E75, CN963E80, CN963J85. CN964, CN965, CN965A80, CN966, CN966A80, CN966B85, CN966H90, CN9%6J75, CN968, CN969, CN970, CN970A60, CN970E60, CN971, CN971A80, CN971J75, CN972, CN973, CN973A80, CN973H85, CN973J75, CN975, CN977, CN977C70, CN978, CN980. CN981, CN981A75, CN981B88, CN982, CN982A75, CN982B88, CN982E75, CN983, CN984, CN985, CN985B88, CN986, CN989, CN991, CN992, CN994, CN996, CN997, CN999, CN9001, CN9002, CN9004, CN9005, CN9006, CN9007, CN9008, CN9009, CN9010, CN9011, CN9013, CN9018, CN9019, CN9024, CN9025, CN9026, CN9028, CN9029, CN9030, CN9060, CN9165, CN9167, CN9178, CN9290, CN9782, CN9783. CN9788, and CN9893 (all manufactured by Sartomer Company), EBECRYL210, EBECRYL220, EBECRYL230. EBECRYL270, KRM8200, EBECRYL4666, EBECRYL5129, EBECRYL8210, EBECRYL8301, EBECRYL8804, EBECRYL8807, EBECRYL9260, KRM7735, KRM8296, KRM8452, EBECRYL4858, EBECRYL8402, EBECRYL9270, EBECRYL8311, and EBECRYL8701 (all manufactured by Daicel Cytec). These can be used alone or in combination.

Synthetic polymerizable oligomers can be used; a synthetic polymerizable oligomer and a procured polymerizable oligomer can be used in combination.

The proportion of the polyfunctional compound or polymerizable oligomer (B) to the composition (1) is preferably from 1 to 70 percent by mass and more preferably from 10 to 50 percent by mass.

First Polymerization Initiator (C)

The first polymerization initiator (C) is not particularly limited and can be selected to a particular application.

Specific examples include, but are not limited to, benzophenone, acetophenone, 2-hydroxy-2-phenylacetophenone, 2-ethoxy-2-phenyl acetophenone, 2-methoxy-2-phenyl acetophenone, 2-isopropoxy-2-phenyl acetophenone, 2-isobutoxy-2-phenyl acetophenone, 4-methoxy acetophenone, 4-benzyloxy acetophenone, 4-phenyl acetophenone, 4-benzoyl 4'-methyl diphenyl sulfide, methyl benzoylformate, an oligomer [benzene, (1-methylethynyl)-, homopolymer, ar-(2-hydroxy-2-methyl-1-oxopropyl) derivative] (Esacure ONE, manufactured by IGM Resins B.V.), 2-benzyl-2-dimethylamino-1-4-morpholinophenyl)-butanone-1 (Irgacure 369), bis(4,6-trimethyl benzoyl)phenylphosphine oxide (Irgacure 819), 2,4,6-trimethyl benzoyl diphenylphosphine oxide (Irgacure TPO), polyethylene glycol 200-di(β-4 (4-(2-dimethyl amino-2-benzyl)butanonylphenyl)piperazine (Omnipol 910, manufactured by IGM Resins B.V.), and 1,3-di({α-[1-chloro-9-oxo-9H-thioxanthen-4-yl)oxy] acetylpoly[oxy(1-methylethylene)]{oxy)-2,2-bis({α-[1-chloro-9-oxo-9H-thioxanthen-4-yl)oxy]acetyl poly[oxy(1-methylethylene)]{oxymethyl)propane (Speedcure 7010, manufactured by Lambson Group Ltd.). These can be used alone or in combination.

The proportion of the first polymerization initiator (C) to the entire composition (1) is preferably from 1 to 20 percent by mass, more preferably from 3 to 15 percent by mass, and furthermore preferably from 5 to 10 percent by mass.

First Hydrogen Donor (D)

The first hydrogen donor (D) supplies hydrogen to the first polymerization initiator (C). It includes a compound that supplies hydrogen to a radical polymerization initiator having a backbone such as benzophenone backbone excited by light.

A compound having a benzophenone or another backbone as the radical polymerization initiator starts polymerization according to the following polymerization starting mechanism. That is, a compound having a benzophenone or another backbone is excited by light. Thereafter, the excited molecule extracts hydrogen from a nearby compound, a radical is generated on the compound from which the hydrogen has been extracted, and the radical becomes an initiation point of radical polymerization. As a result, the compound having a benzophenone or other backbone functions as a photoradical polymerization initiator. That is, if there is a compound from which hydrogen is extracted together with a compound having a benzophenone or other backbone, polymerization initiates by the above-described polymerization initiation mechanism. Therefore, if hydrogen is extracted from the radically polymerizable compound used in the present embodiment, polymerization may start therefrom.

The first hydrogen donor (D) smoothly supplies hydrogen to a compound having a benzophenone or other backbone to efficiently proceed polymerization. Therefore, the polymerization reaction property is greatly enhanced by adding the first hydrogen donor (D) to the first polymerization initiator (C) while keeping yellowing at a low level.

The first hydrogen donor (D) includes a compound that supplies hydrogen to a compound molecule having a benzophenone or other backbone excited upon light irradiation.

Specific examples of the first hydrogen donor (D) include, but are not limited to, compounds having an amino group such as diethyl amine, diphenyl amine, triethyl amine, tributyl amine, diethano lamine, triethanol amine. N,N-diethyl ethanol amine, dipropyl amine. N,N-dimethyl aniline, p-diethyl amino ethylbenzoate, and p-dimethyl amino ethylbenzoate, compounds having a hydroxyl group such as methanol, ethanol, propanol, isopropyl alcohol, butanol, ethylene glycol, propylene glycol, butane diol, and phenol, compounds having a ether bond such as tetrahydrofuran, tetrahydropyran, dioxane, trioxane, diethylene glycol, dipropylene glycol, propylene glycol monomethyl ether, and propylene glycol monomethylether acetate, mercapto compounds such as butane thiol, propane thiol, hexane thiol, decane dithiol. N-dodecyl mercaptan, dodecyl(4-methylthio)phenylether, 4-dimethyl mercaptobenzene, 2-mercaptoethanol, 1-mercapto-2-propahonol, 3-merrcapto-2-butanol, 3-mercapto-1,2-propena diol, and mercapto phenol, disulfides obtained by oxidizing these mercaptos, and compounds having a mercapto group such as thiobutyl glycolate, ethylene glycol bisthio glycolate, ethylene glycol bisthio propionate, butane diol bis(3-mercapto isobuthylate), 1,4-butane diol bisthio propionate, -butane diol bisthio propionate, β-meracapto octyl propionate, β-mercapto methoxybutyl propionate, trishydroxyethyl tristhiopropionate, trimethyl propane tris(3-mercapto isobutylate), trimethylol propane tris(3-mercapto butylate), trimethylol propane tris(β-thiopropionate), trimethylol propane tristhio glycolate, trimethylol propane tristhio propionate, pentaerythritol tetrakis(3-mercapto propionate), pentaerythritol tetrakis thioglycolate. Pentaerythriol tetrakis thiopropionate, thio glycol acid, thiosalicylic acid, thio malic acid, mercapto acetic acid, 2-mercapto ethane sulfolic acid, 2-mercapto nicotinic acid, 2-mercapto propionic acid, 3-mercapto propane sulfonic acid, 3-mercapto propionic acid, 3-mercapto butylic acid, 4-mercapto butane sulfonic acid, 3-[N-(2-mercaptoethyl)amino] propionic acid, 3-[N-(2-mercaptoethyl)carbamoyl propionic acid, 2-mercapto-3-pyridinol, 2-mercapto imidazol, 2-mercapto ethylamine, 2-mercapto benzoimidazol, 2-mercapto benzothiazol, 6-trimercapto-s-triadine, N-(2-mercaptopropionyl)glycine, N-(3-mercaptopripionyl)alanine, diisopropyl thioxanthone, diethyl thioxanthone, thiophosphites, and trimercapto propionic acid tris(2-hydroxyethyl)isocyanulate. Others can be used.

Compounds having an amino group are particularly preferably used as the first hydrogen donor (D) because the energy for transferring hydrogen is low. Of these, more preferred specific examples include, but are not limited to, 2-(N,N-dimethylamino) methyl benzoate, 4-(N,N-dimethylamino) ethyl benzoate, 4-(N,N-diethylamino) ethyl benzoate, and a mixture (Speedcure 7040, manufactured by Lambson Group Ltd.) of 1,3-di({α-4-(dimethylamino)benzoylpoly[oxy(1-methylethylene)]}oxy)-2,2-bis({α-4-(dimethylamino)benzoylpoly[oxy(1-methylethylene)]oxymethyl) propane and {α-4-(dimethylamino)benzoylpoly(oxyethylene)-poly [oxy(1-methylethylene))]-poly(oxyethylene)4-(dimethylamino)benzoate.

The proportion of the first hydrogen donor (D) to the entire composition (1) is preferably from 0.1 to 10 percent by mass and more preferably from 0.1 to 5 percent by mass. The proportion of the first hydrogen donor (D) to the polymerizable compound in the composition (1) is preferably from 0.01 to 50 percent by mass and more preferably from 0.1 to 20 percent by mass.

Other Polymerizable Compound (E)

The composition (1) may furthermore contain the polymerizable compound (E) other than the (meth)acrylamide compound (A) and the polyfunctional compound or polymerizable oligomer (B). The polyfunctional compound or polymerizable oligomer (B) is not particularly limited as long as it is polymerized upon an application of active energy such as ultraviolet and electron beams. It can be suitably selected to suit to a particular application. The polyfunctional compound or polymerizable oligomer (B) is selected to adjust the reaction speed, ink properties, and cured film properties. It can be used alone or in combination. The curability and viscosity of the composition and the hardness and attachability of cured matter can be readily adjusted to suit to a particular application by using with the other polymerizable compound (E).

Examples of the other polymerizable compound (E) include, but are not limited to, radically monofunctional polymerizable compounds.

Examples of the radically polymerizable compound include, but are not limited to, monofunctional (meth)acrylates and aromatic vinyls. These can be used alone or in combination. (Meth)acrylate in the specification of the present disclosure means at least one of acrylate and methacrylate and (meta)acrylic means at least one of the acrylic and methacrylic. These can be used alone or in combination.

The monofunctional (meta)acrylates include, but are not limited to, tetrahydrofurfuryl (meth)acrylate, hexyl(meta)acrylate, 2-ethylhexyl(meta)acrylate, tert-octyl (meta)acrylate, isoamyl(meta)acrylate, decyl(meta)acrylate, isodecyl (meta)acrylate, stearyl(meta)acrylate, isostearyl (meth)acrylate, cyclohexyl(meta)acrylate, 4-n-butylcyclohexyl (meta)acrylate, boronyl(meta)acrylate, isoboronyl(meta)acrylate, benzyl(meta)acrylate, butoxyethyl (meta)acrylate, 2-chloroethyl (meta)acrylate,4-bromobutyl(meta)acrylate, cyanoethyl(meta)acrylate, benzyl(meta)acrylate, butoxymethyl(meta)acrylate, 3-methoxybutyl(meta)acrylate, alkoxymethyl(meta)acrylate, alkoxyethyl(meta)acrylate, 2-(2-methoxyethoxy)ethyl(meth)acrylate, 2-(2-butoxyethoxy)ethyl(meth)acrylate, 2, 2, 2-tetrafluoroethyl (meta)acrylate, 1H, 1H, 2H, 2H-perfluorodecyl (meta)acrylate, 4-butylphenyl(meta)acrylate, phenyl(meta)acrylate, 2, 4, 5-tetramethylphenyl(meta)acrylate, 4-chlorophenyl(meta)acrylate, phenoxymethyl(meta)acrylate, phenoxyethyl (meta)acrylate, glycidyl(meta)acrylate, glycidyloxydibutyl (meth)acrylate, glycidyloxyethyl(meth)acrylate, glycidyloxypropyl(meta)acrylate, hydroxyalkyl(meta)acrylate, 2-hydroxyethyl(meta)acrylate, 3-hydroxypropyl(meta)acrylate, 2-hydroxypopyl(meta)acrylate, 2-hydroxybutyl (meth)acrylate, 4-hydroxybutyl(meth)acrylate, dimethylaminoethyl(meta)acrylate, diethylaminoethyl (meta)acrylate, dimethylaminopropyl(meta)acrylate, diethylaminopropyl(meta)acrylate, trimethoxysilylpropyl(meta)acylate, trimethylsilyl propyl(meta)acrylate, polyethylene oxide monomethylether(meth)acrylate, oligoethylene oxide monomethylether(meta)acrylate, polyethylene oxide(meta)acrylate, oligoethylene oxide(meta)acrylate, oligoethylene oxide monoalkylether(meth)acrylate, polyethylene oxide monalkylether(meth)acrylate, dipropylene glycol(meta)acrylate, polypropylene oxide monoalkylether(meth)acrylate, oligopropylene oxide monoalkylether(meth)acrylate, 2-methacryloyloxy methyl succinate, 2-methacryloxy hexahydrophthalate, 2-methacryloyloxyethyl-2-hydroxypropyl phthalate, butoxy diethyleneglycol(meta)acrylate, triflioroethyl(meta)acrylate, perfluorooctyl ethyl(meth)acrylate, 2-hydroxy-3-phenoxypropyl(meth)acrylate, ethylene oxide-modified phenol(meta)acrylate, ethylene oxide-modified crezole(meta)acrylate, ethylene oxide-modified nonylphenol (meta)acrylate, propylene oxide-modified nonyl phenol (meta)acrylate, ethylene oxide-modified-2-ethylhexyl (meta)acrylate, acrylic acid-2-(2-vinyloxyethoxy)ethyl, and benzyl acrylate. These can be used alone or in combination.

Of these acrylates, phenoxyethyl(meta)acrylate, benzyl acrylate, acrylic acid-2-(2-viniloxyethoxy)ethyl, 2-hydroxyethyl(meta)acrylate, 3-hydroxypropyl(meta)acrylate, 2-hydroxypropyl(meth)acrylate, and 4-hydroxybutyl (meth)acrylate are preferable to achieve low viscosity, low level of odor, and good curability. Phenoxyethyl(meta)acrylate, benzylacrylate, and acrylic acid-2-(2-vinyloxyethoxy)ethyl are particularly preferable to be compatible with a photopolymerization initiators and other monomers.

Examples of the monofunctional polymerizable compound (E) include, but are not limited to, a urethane (meth)acrylate derivative obtained by reacting a compound having an isocyanate group with a (meth)acrylic acid ester having a hydroxyl group and an epoxy (meth)acrylate derivative obtained by reacting (meth)acrylic acid with a compound having an epoxy group.

In addition to the derivatives of (meth)acrylic acid derivative, N-vinyl compounds such as N-vinylcaprolactam. N-vinylpyrrolidone, and N-vinylformamide, aromatic vinyl compounds such as styrene and α-methylstyrene, vinyl ethers such as diethylene glycol divinyl ethers, triethylene glycol divinyl ether, and cyclohexane dimethanol divinyl ether, and allyl compounds such as allyl glycidyl ether, diallyl phthalate, and triallyl trimellitate can be used.

Specific examples of the aromatic vinyl include, but are not limited to, styrene, methyl styrene, dimethyl styrene, trimethyl styrene, ethyl styrene, isopropyl styrene, chloromethyl styrene, methoxy styrene, acetoxy styrene, chloro styrene, dichloro styrene, bromo styrene, vinyl benzoate methylester, 3-methyl styrene, 4-methyl styrene, 3-ethyl styrene, 4-ethyl styrene, 3-propyl styrene, 4-propyl styrene, 3-butyl styrene, 4-butyl styrene, 3-hexyl styrene, 4-hexyl styrene, 3-octyl styrene, 4-octyl styrene, 3-(2-ethylhexyl) styrene, 4-(2-ethylhexyl) styrene, allyl styrene, isopropenyl styrene, butenyl styrene, octenyl styrene, 4-t-butoxy carbonyl styrene, 4-methoxy styrene, and 4-t-butoxy styrene. These can be used alone or in combination.

The proportion of the other polymerizable compound (E) in the composition (1) is preferably from 1.0 to 30 percent by mass and more preferably from 5.0 to 20 percent by mass.
Other Components The composition (1) may furthermore optionally contain other components such as a sensitizer, light stabilizer, surface treating agent, surfactant, antioxidant, antiaging agent, crosslinker, polymenzation inhibitor, plasticizer, preservative, pH regulator, defoaming agent, moisturizer, dispersant, and dye.
First Exposing Device The first exposing device exposes the first active energy curing composition (1) discharged to a medium to first active energy.

The first active energy is not particularly limited as long as it is able to apply energy necessary for allowing polymerization of polymerizable components in the composition. Examples of the first active energy include, but are not limited to, electron beams, α-rays, β-rays, γ-rays, and X-rays, in addition to ultraviolet rays. Preferably, in another embodiment using a particularly high energy light source, it obviates the need for a polymerization initiator to proceed polymerization reaction. In addition, mercury-free is strongly preferable in the case of ultraviolet irradiation to protect the environment and it is extremely useful to replace with a GaN-based semiconductor ultraviolet light-emitting device from industrial and environmental points of view. Furthermore, ultraviolet light-emitting diodes (UV-LED) and ultraviolet laser diodes (UV-LD) are preferable as ultraviolet light sources because they have small sizes, long working life, and high efficiency, and enjoy high cost performance.

The first active energy is preferably ultraviolet having a peak in the range of wavelength of from 365 to 405 nm. In this range, safeness is improved and the consumption energy is reduced. UV-LED is preferable as the device for emitting ultraviolet.

The first active energy preferably has a quantity of exposure light of from 10 to 50) mJ/cm$^2$. A quantity of exposure light of from 10 to 500 mJ/cm$^2$ improves safeness and reduces the consumption energy.
Second Discharging Device and Second Discharging The second discharging device discharges the ink (2) to the first active energy curing composition (1) exposed to the first active energy. An inkjet head can be the second discharging device. Using a line head is particularly preferable. The second discharging device can discharge one or more types of the inks (2).

In the second discharging, the ink (2) is discharged to the first active energy curing composition (1) exposed to the first active energy.
Ink (2)

The ink (2) contains a coloring material, a water-soluble organic solvent, and water. It may furthermore optionally contain other components. The ink (2) is preferably discharged from an inkjet head so that it can be referred to as aqueous ink for inkjet printing.

Since the ink (2) contains the first active energy curing composition (1) containing the (meth)acrylamide compound containing the first (meth)acrylamide compound (A) having a (meth)acrylic group with a high polarity, it does not repel or bleed irrespective of any composition; it is, however, preferable that the sum of water and the water-soluble organic solvent in the composition be 90 percent or more and the water to the water-soluble organic solvent ratio be from 40:60 to 60:40.
Coloring Material The coloring material mentioned above is not particularly limited and can be suitably selected to suit to a particular application. For example, coloring material insoluble or little soluble in water is used. "Insoluble or little soluble in water" means that 10 parts by mass or more of a coloring material is not dissolved in 0 W parts of water at 20 degrees C. "Dissolved" means separation or sedimentation of a coloring material is not visually present at the surface or the bottom of an aqueous solution.

Examples of the coloring material are dyes such as oil-soluble dyes and dispersed dyes and pigments.

Oil-soluble dye and dispersion dye is preferable to enhance adsorption and encapsulation; however, pigments are preferable when it comes to the light resistance of an obtained image.

The pigment mentioned above includes an organic pigment and an inorganic pigment.

Specific examples of the black and white pigments include, but are not limited to, carbon black (C.I. Pigment Black 7) such as furnace black, lamp black, acetylene black, and channel black, metals such as copper, iron (C.I. Pigment Black 11), and titanium oxides, and organic pigments such as aniline black (C.I. Pigment Black 1).

Specific examples of the pigments for color include, but are not limited to, C.I. Pigment Yellow 1 (Fast Yellow G), 3, 12 (disazo yellow AAA), 13, 14, 17, 24, 34, 35, 37, 42 (yellow iron oxide), 53, 55, 74, 81, 83 (disazo yellow HR), 95, 97, 95, 97, 98, 100, 101, 104, 108, 109, 110, 117, 120, 138, and 153, C.I. Pigment Orange 5, 13, 16, 17, 36, 43, and 51; C.I. Pigment Red 1, 2, 3, 5, 17, 22 (Brilliant Fast Scarlet), 23, 31, 38, 48:2 {Permanent Red 2B(Ba)}, 48:2 {Permanent Red 2B(Ca)}, 48:3 {Permanent Red 2B(Sr)}, 48:4{Permanent Red 2B(Mn)}, 49:1, 52:2, 53:1, 57:1 (Brilliant Carmine 6B), 60:1, 63:1, 63:2, 64:1, 81 (Rohdamine 6G Lake), 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19 (Quinacridone Red), 23, and 38; C.I. Pigment Blue 1, 2, 15 (Phthalocyanine Blue), 15:1, 15:2, 15:3 (Phthalocyanine Blue G), 15:4, 15:6 (Phthalocyanine Blue E), 16, 17:12 (Prussian Blue), 28 (Cobalt Blue), 29 (Ultramarine), 56, 60, and 63, and C.I. Pigment Green 1, 4, 7, 8, 10, 17, 18, and 36. Carboxylic acid modified pigments are preferable.

The proportion of a coloring material in the ink (2) is preferably from 1 to 20 percent by mass, more preferably from 3 to 12 percent by mass, and particularly preferably from 5 to 10 percent by mass.

Water-Soluble Organic Solvent

The water-soluble organic solvent mentioned above is not particularly limited. Materials for use in ink for inkjet printing can be used.

Specific examples of the water-soluble organic solvent include, but are not limited to, hydroxy compounds such as 2-methyl-1,3-propane diol, 3-methyl-1,3-butane diol, 3-methyl-1,5-pentane diol, 2-ethyl-1,3-hexane diol, glycerin, 1,3-butane diol, triethylene glycol, 1,6-hexane diol, polypropylene glycol, 1,5-pentane diol, diethylene glycol, dipropylene glycol, trimethylol propane, trimethyllol ethan or ethylene glycol, 1,3-propane diol, 1,4-butane diol, 2,3-butane diol, tripropylene glycol, tetraethylene glycol, hexylene glycol, polyethylene glycol, polypropylene glycol, 1,2,6-hexane triol, 1,2,4-butane triol, 1,2,3-butane triol, thiodiglycol, and pentaerythritol, polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether, polyhydric alcohol aryl ethers such as ethylene glycol monophenyl ether and ethylene glycol monobenzyl ether, nitrogen-containing heterocyclic compounds (lactams) such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone, amides such as formamide, N-methylform amides, and N. N-dimethylformamide, sulfur-containing compounds such as dimethyl sulfoxide, sulfolane, and thiodiethanol, propylene carbonate, and ethylene carbonate. The water-soluble organic solvent can be used alone or in combination. However, it is not limited to these examples.

The proportion of the water-soluble organic solvent in the ink (2) is preferably from 10 to 50 percent by mass.

Water

Water is not particularly limited and can be suitably selected to suit to a particular application. So-called deionized water having a specific resistance of 10.0 MΩ or greater is preferable.

The proportion of water in the ink (2) is not particularly limited and can be suitably selected to suit to a particular application. In order to enhance drying and discharging reliability of the ink, the proportion is preferably from 10 to 90 percent by mass and more preferably from 30 to 80 percent by mass.

Other Components

An example of the other components is a surfactant. The surfactant is not particularly limited and can be suitably selected to suit to a particular application as long as the combinational use of a surfactant and a coloring material, humetcant, and permeating agent does not have an adverse impact on dispersion stability. Surfactants having a low surface tension and a high level of leveling are preferable when used for printing on printing paper. At least one type of surfactant selected from a silicone-based surfactant and a fluorochemical surfactant is suitable. Of these, fluorochemical surfactant is particularly preferable.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not readily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carbonic acid compounds include, but are not limited to, perfluoroalkyl carbonic acid and salts of perfluoroalkyl carbonic acid.

Specific examples of the perfluoroalkyl phosphoric acid ester compounds include, but are not limited to, perfluoroalkyl phosphoric acid esters and salts of perfluoroalkyl phosphoric acid esters.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain.

Specific examples of the counter ion of the salt in these fluorochemical surfactants include, but are not limited to, Li, Na, K, $NH_4$, $NH_3CH_2CH_2OH$, $NH_2(CH_2CH_2OH)_2$, and $NH(CH_2CH_2OH)_3$.

Synthetic or procured fluorochemical surfactant can be used. Specific examples of the procured surfactant include, but are not limited to, Surflon series including S-111, S-112, S-113, S-121, S-131, S-132, S-141, and S-145, manufactured by ASAHI GLASS CO., LTD., Fluorad series including FC-93, FC-95, FC-98, FC-129, FC-135, FC-170C, FC-430, and FC-431, manufactured by SUMITOMO 3M Limited, Megaface series including F-470, F1405, and F-474, manufactured by DIC Corporation, Zonyl TBS, FSP, FSA, FSN, FSO-100, FSO, FSO-300, and UR, manufactured by E.I. du Pont de Nemours and Company, FT-110, FT-250, FT-252, FT-400S, FT-150, and FT-400SW, manufactured by NEOS COMPANY LIMITED, and PF-151N, manufactured by OMNOVA SOLUTIONS. Of these, to enhance the print quality, in particular coloring and uniform dying for paper in particular, FT-110, FT-250, FT-251, FT-400S, FT-150 and FT-400SW, all manufactured by NEOS COMPANY LIMITED and PF-151N, manufactured by OMNOVA SOLUTIONS INC., are particularly preferable.

The silicone-based surfactant is not particularly limited and can be suitably selected to suit to a particular application. Silicone-based surfactant not decomposed in a high pH environment is preferable.

Specific examples include, but are not limited to, side-chain modified polydimethyl siloxane, both-terminal modified polydimethyl siloxane, one-terminal-modified polydimethyl siloxane, and side chain both-terminal modified polydimethyl siloxane. Silicone-based surfactants having a polyoxyethylene group or polyoxyethylene polyoxypropylene group as the modification group are particularly preferable because these demonstrate good properties as aqueous surfactants.

Such surfactants can be synthesized or procured. Procured products are available from companies including BYK Chemie GmbH., Shin-Etsu Silicone Co., Ltd., and Dow Corning Toray Co., Ltd.

There is no specific limit to the polyether-modified silicon-containing surface active agent. An example is a compound in which a polyalkylene oxide structure is introduced into the side chain of the Si site of dimethyl polysilooxane.

Synthetic or procured polyether-modified siloxane compound are usable. Specific examples of the product include, but are not limited to, KF-618, KF-642, and KF-643, manufactured by Shin-Etsu Chemical Co., Ltd.

In addition to the fluorochemical surfactant and silicone-based surfactant, anionic surfactants, nonionic surfactants, and amphoteric surfactants can be used.

Specific examples of the anionic surfactants include, but are not limited to, polyoxyethylene alkylether acetates, dodecyl benzene sulfonates, succinic acid ester sulfonates, laurates, and poly oxyethylene alkylether sulfates.

Specific examples of the nonionic surfactants include, but are not limited to, acetylene glycol-based surfactants, polyoxyethylene alkyl ethers, polyoxyethylene alkylphenyl ethers, polyoxyethylene alkylesters, and polyoxyethylene sorbitane aliphatic acid esters.

Specific examples of acetylene glycol-based surfactants include, but are not limited to, 2,4,7,9-tetramethyl-5-desine-4,7-diol, 3,6-dimethyl-4-octine-3,6-diol, and 3,5-dimethyl-1-hexine-3-ol.

Specific examples of the product of the acetylene glycol-based surfactant include, but are not limited to, Surfynol series including 104, 82, 465, 485, and TG, manufactured by Air Products Limited.

Specific examples of amphoteric surfactants include, but are not limited to, lauryl amino propionic acid salts, lauryl dimethyl betaine, steallyldimethylbetaine, lauryl dihydroxyethyl betaine, lauryldimethyl amineoxide, myristyl dimethylamine oxide, stearyldimethylamine oxide, dihydroethyl lauryl amineoxide, polyoxyethylene palm oil alkyldimethyl amineoxide, dimethylalkyl (palm) betaine, and dimethyl laurylbetaine. Products of such surfactants are readily available from surfactant manufactures including Nikko Chemicals Co., Ltd., NIHON EMULSION Co., Ltd., Nippon Shokubai Co., Ltd., TOHO Chemical Industry Co., Ltd., Kao Corporation, ADEKA CORPORATION, Lion Corporation, AOKI OIL INDUSTRIAL CO., LTD., and Sanyo Chemical Industries, Ltd.

The surfactant is not limited to these. These can be used alone or in combination. Even when a single surfactant is not readily dissolved in ink for printing, a surfactant mixture can be stably present therein.

The proportion of the surfactant in the ink (2) is preferably from 0.01 to 3 percent by mass and more preferably from 0.5 to 2 percent by mass. The proportion of the entire liquid composition having a boiling point higher than water in ink at 25 degrees C. is preferably 20 percent by mass or less and preferably 15 percent by mass or less. A proportion less than 0.01 percent by mass may degrade the effect of a surfactant added. A proportion higher than 3 percent by mass causes the permeation to a medium excessively high, which leads to a decrease in the image density and occurrence of strike-through.

An example of the aforementioned other compositions is a resin emulsion. The resin emulsion has a continuous phase of water and a dispersion phase of the following resin component. Since a resin emulsion is likely to become sticky and agglomerate, it minimizes the permeation of a coloring component and promotes fixing on a medium. A resin emulsion forms a film on a medium depending on the type of the resin emulsion, which enhances the abrasion resistance of printed matter.

Examples of the resin component include, but are not limited to, acrylic resin, vinyl acetate resin, styrene resin, styrene-butadiene resin, butadiene resin, vinyl chloride resin, and acrylic-styrene resin. These resins are preferably polymers having both a hydrophilic portion and a hydrophobic portion. The particle diameter of such resin components is not particularly limited and preferably around 150 nm or less and more preferably from about 5 to about 100 nm.

These resin emulsion can be obtained by mixing resin particles with water and optionally a surfactant. Acrylic resin emulsion or styrene-acrylic resin emulsion can be obtained by polymerizing (meth)acrylic acid ester or styrene, optionally mixing (meth)acrylic acid ester with a surfactant and water.

The resin component to surfactant ratio is preferably from about 10:1 to about 5:1. It is difficult to form an emulsion when the ratio is less than this range. The ratio higher than this range is not preferable because it degrades the water resistance and permeation of ink.

The proportion of resin and water as the dispersion component in the resin emulsion mentioned above is from 60 to 400 parts of water and preferably from 100 to 200 parts to 100 parts of the resin.

Specific examples of procurable resin emulsions include, but are not limited to, microjel E-1002 and E-5002 (styrene-acrylic resin, manufactured by NIPPONPAINT Co., Ltd.), VONCOAT 4001 (acrylic resin emulsion, manufactured by DIC Corporation), VONCOAT 5454 (styrene-acrylic resin emulsion, manufactured by DIC Corporation), SAE-1014 (styrene-acrylic resin emulsion, manufactured by Zeon Corporation), and Saivinol SK-200 (acrylic resin emulsion, manufactured by Saiden Chemical Industry Co., Ltd.).

Optionally, a pH regulator can be added. Ink materials having a carboxylic acid group as a hydrophilic group are likely to have acidity when a coloring material is kneaded and dispersed with water. The surface of pigment particles dispersed in a medium such as water is covered with a dissociated carboxylic acid group and the entire ink has acidity. This dissociation of carboxylic acid group at the surface of particles is likely to be inhibited when pH becomes low. Once a carboxylic acid group is dissociated, dispersion particles agglomerate, resulting in defective discharging. A pH regulator is added to keep alkalinity to prevent this inhibition of dissociation, agglomeration, and defective discharging so that the dispersion state and discharging are stabilized.

pH of the ink (2) is preferably from 7 to less than 11. However, when the pH is too high, for example, 11 or higher, the ink excessively dissolves an inkjet head or an ink supplying unit, which causes modification and leakage of the ink, and defective discharging.

It is preferable to prepare the ink (2) by kneading and dispersing the pigment mentioned above with water and optionally a surfactant followed by dispersing the obtained liquid dispersion and other additives such as a water-soluble organic solvent, preservatives and fungicides, and corrosion inhibitor in water. It is more desirable to add a pH regulator during kneading and dispersing a pigment with a surfactant in water before additives such as a water soluble solvent and a permeating agent are added. This is because a pH regulator may disrupt the dispersion.

Specific examples of the pH regulator include, but are not limited to, alcohol amines, hydroxides of alkali metal elements, ammonium hydroxides, phosphonium hydroxides, and alkali metal carbonates.

Specific examples of the alcohol amines include, but are not limited to, diethanolamine, triethanolamine, and 2-amino-2-ethyl-1,3-propanediol.

Specific examples of the hydroxides of alkali metal elements include, but are not limited to, lithium hydroxide, sodium hydroxide, and potassium hydroxide.

Specific examples of the ammonium hydroxides include, but are not limited to, ammonium hydroxide, quaternary ammonium hydroxide, and quaternary phosphonium hydroxide.

Specific examples of the alkali metal carbonates include, but are not limited to, lithium carbonate, sodium carbonate, and potassium carbonate.

Optionally, a preservatives and fungicides can be added.

Specific examples of the preservatives and fungicides include, but are not limited, dehydrosodium acetate, sodium sorbinate, 2-pyridine thiol-1-oxide sodium, sodium benzoate, pentachlorophenol sodium, and 1,2-benzothiazoline-3-one.

Optionally, a corrosion inhibitor can be added. Specific examples of the corrosion control (anti-corosion) agents include, but are not limited to, acid sulfite, thiosodium sulfate, ammonium thiodiglycolate, diisopropyl ammonium nitride, pentaerythritol quaternary nitdride, dicyclohexyl ammonium nitride, and benzotriazole.

Furthermore, a metal ion encapsulant, water-soluble ultraviolet absorber, water-soluble infrared absorber can be added to suit to a particular application.

Other

The ink (2) preferably has a viscosity of from 3 to 40 mPa·s and more preferably from 6 to 20 mPa·s at 23 degrees C. to enhance its discharging stability.

The ink (2) is highly compatible with inkjet printing executing liquid droplet discharging by a line head. Beading is further reduced by an inkjet method using a line head because it is fixed. Abrasion resistance can be enhanced in a high performance one pass printing by a high performance inkjet printer.

The ink (2) can be dried by a drying device after it is discharged. For example, the ink (2) can be dried by heated wind. It is preferable to dry the ink (2) before the third discharging device, which is described below, discharges the second active energy curing composition (3).

Third Discharging Device and Third Discharging

The image forming device of the present embodiment may use a third discharging device for discharging the second active energy curing composition (3). It is preferable to use another exposing device for exposing the second active energy curing composition (3) to active energy when the third discharging device is used. This exposing device is referred to as the second exposing device to distinguish from the first exposing device for exposing the composition (1) to the first active energy. The second exposing device may have the same configuration and specification as the first exposing device.

In the third discharging, the second active energy curing composition (3) is discharged to the ink (2) after the second discharging. It is preferable to expose the second active energy curing composition (3) to second active energy after the third discharging.

After the third discharging device discharges the second active energy curing composition (3), the second active energy curing composition (3) is exposed to second active energy to form an image or film, thereby enhancing the abrasion resistance.

In the present embodiment, the third discharging device discharges the second active energy curing composition (3) onto the ink (2) and the second exposing device exposes the discharged second active energy curing composition (3) to the second active energy. The third discharging device is disposed downstream of the second discharging device and upstream of the second exposing device in the conveyance direction of a medium.

An inkjet head can be the third discharging device.

Second Active Energy Curing Composition (3)

The second active energy curing composition (3) contains a second (meth)acrylamide compound (A) having a (meth)acrylic group, a second polyfunctional compound or polymerizable oligomer (B), a second polymerization initiator (C), and other optional components such as a second hydrogen donor (D).

The second active energy curing composition (3) can be also referred to as an active energy curing post-processing fluid or active energy curing top coating fluid. The second active energy curing composition (3) is also simply referred to as the composition (3) or post-processing fluid.

The second (meth)acrylamide compound (A) having a (meth)acrylic group, the second polyfunctional compound or polymerizable oligomer (B), the second polymerization initiator (C), and the second hydrogen donor (D) are not particularly limited, suitably selected to suit to a particular application, and can be the same as those for use in the composition (1). The composition (3) can be the same formulation as the composition (1).

The proportion of each component of the composition (3) can be the same as that of the composition (1). The proportion "in the composition (1)" is replaced with "in the composition (3).

As described above, the first or second (meth)acrylamide compound (A) having (meth)acrylic group having a (meth) acrylic group cures during polymerization reaction caused under the presence of a starting species such as radical produced from a polymerization initiator. The polyfunctional compound of the first or second polyfunctional compound or polymerizable oligomer (B) has two or more (meth)acryloyl groups and the polymerizable oligomer thereof means a low polymer having a polymerization degree of from about 2 to about 20 of the polymers polymerized from a monomer and having two or more (meth) acryloyl groups. The (meth)acrylic acid means (meth)acrylic acid and a mixture thereof, which applies to the similar terms and substances.

Medium

The medium or recording medium mentioned above is not particularly limited and can be suitably selected to suit to a particular application. Specific examples include, but are not limited to, plain paper, coated paper, gloss paper, special paper, offset printing paper, offset printing coated paper, film, transparent sheets, general purpose printing paper, thread, fiber, cloth, leather, metal, plastic, glass, wood, ceramics, nail, artificial nail, or composites thereof. The offset printing paper has a strong surface, free of fluff or picking of paper, excellent dimension stability, free of waving, wrinkling, not expansible or shrinkable, and good texture. The offset printing coated paper further has suitability to blister, which means having suitable moisture and breathability in addition to the properties mentioned above.

Good images can be formed even on a medium such as a non-permeating substrate. The non-permeating substrate has a surface with low moisture permeability and absorbency. It includes a material having a number of hollow spaces inside that are not open to the outside. To be more quantitative, the substrate has a water-absorbency of 10 or less mL/m$^2$ from the start of the contact until 30 msec$^{1/2}$ later according to Bristow's method.

For example, plastic films such as vinyl chloride resin film, polyethylene terephthalate (PET) film, polypropylene film, polyethylene film, and polycarbonate film are suitably used as the non-permeable substrate.

Of these, offset printing coated paper is preferable. Moreover, offset printing coated paper is relatively inexpensive to gloss paper and advantageous to have a smooth and gloss image thereon. However, it suffers a problem of poor absorbency of aqueous ink and degradation of image quality caused by beading. This problem is dissolved by the device of the present embodiment so that images having good beading quality, abrasion resistance, and hardness are produced.

Example of Image Forming Device

The image forming device of the present embodiment is described below with reference to an example of the configuration of the device. FIG. 1 is a schematic diagram illustrating an example in which a first discharging device 50, a first exposing device 51, a second discharging device 52, and a conveying device. A medium 3 is conveyed on a platen 10 the conveying device includes in the direction indicated by the arrow in FIG. 1. The conveying device may have a conveyor roller.

The second discharging device 52 in this example includes a yellow inkjet head 52Y, cyan inkjet head 52C, magenta inkjet head 52M, and black inkjet head 52K and is not limited thereto. Of these heads, the heads selected alone can be used for printing. Alternatively, a white inkjet head can be provided.

In this example, the first discharging device 50, the first exposing device 51, and the second discharging device 52 are disposed in this order from upstream to downstream in the conveyance direction of the medium 3. The image forming device of the present example discharges the composition (1) by the first discharging device 50, exposes the composition (1) to the first active energy by the first exposing device 51, and discharges the ink (2) by the second discharging device 52 from upstream in this order along the conveyance direction of the medium 3. An image or laminate is formed on the medium 3 by this process.

The composition (1) is discharged by the first discharging device, which is, for example, an inkjet head. The composition (1) can be applied to a medium by a member such as a bar coater, a roll coater, a gravure coater, a flexo coater, and a brush. An inkjet head, which applies the composition (1) to a medium in a non-contact manner, or brush is preferable when the medium is nail.

The film thickness of the composition (1) is not particularly limited and can be suitably changed to suit to a particular application. A wet film preferably has a thickness of from 10 to 60 μm.

Figure 2:
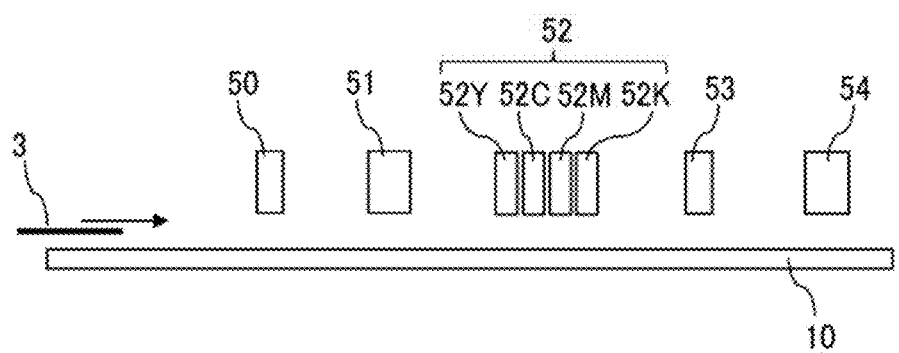
FIG. 2 is a schematic diagram illustrating another example of an image forming device according to an embodiment of the present disclosure.

FIG. 2 is another example of the image forming device of the present embodiment. In FIG. 2, a third discharging device 53 and a second exposing device 54 in addition to the configuration illustrated in FIG. 1. In this example, the first discharging device 50, the first exposing device 51, the second discharging device 52, the third discharging device 53, and the second exposing device 54 are disposed in this order from upstream to downstream in the conveyance direction of the medium 3.

The image forming device of the present example discharges the ink (2) by the second discharging device 52, then discharges the composition (3) by the third discharging device 53, and exposes the composition (3) to the second active energy by the second exposing device. This procedure enhances the abrasion resistance of an image because it has a film formed of the composition (3).

Figure 3:
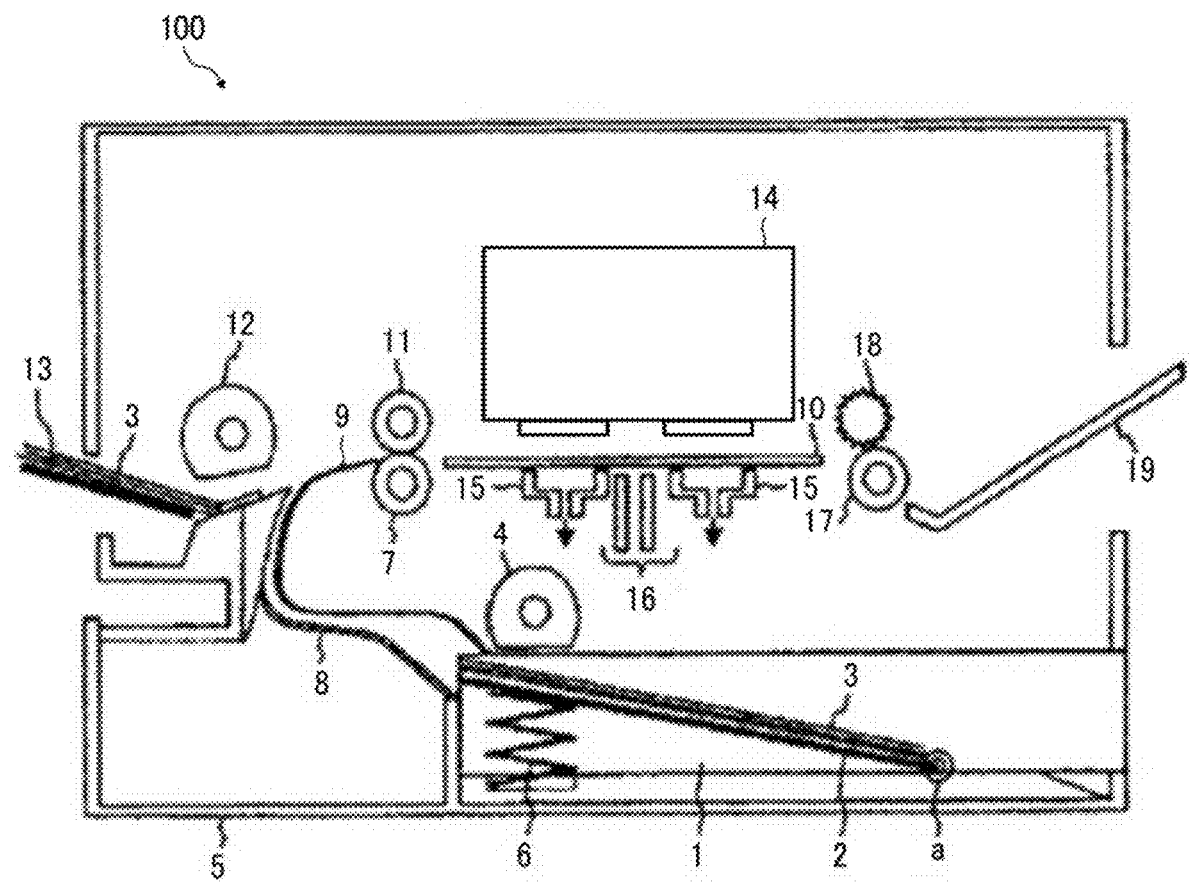
FIG. 3 is a schematic diagram illustrating another example of an image forming device according to an embodiment of the present disclosure.

Other portions in the image forming device of the present embodiment are described with reference to FIG. 3. The first discharging device 50 and the first exposing device 51 illustrated in FIG. 1 are omitted in FIG. 3. A line head 14 is used as the second discharging device in the example illustrated in FIG. 3. In the line head 14, the head for inkjet printing is fixed. This is a schematic diagram illustrating the inside structure of an example of the line head printing device having an ability of high performance one pass printing. The image forming device of this example is referred to an image printing device 100.

The image printing device 100 includes a sheet tray 1 having a base 5 to which both a pressure plate 2 and a sheet feeding rotation body 4 that feeds printing paper as the medium 3 are attached. The pressure plate 2 is rotatable around the rotation axis attached to the base 5 and biased to the sheet feeding rotation body 4 by a pressure plate spring 6.

A separation pad made of a material having a large friction coefficient such as artificial leather is provided to the portion of the pressure plate 2 opposing the sheet feeding rotation body 4 to prevent multi-feed of the medium 3. A release cum is provided to cancel the contact between the pressure plate 2 and the sheet feeding rotation body 4.

In the configuration mentioned above, the release cum presses down the pressure plate 2 to a stand-by position in a stand-by state. At this position, the pressure plate 2 and the sheet feeding rotation body 4 are not in contact with each other. When the drive force by the conveyor roller 7 is transferred to the sheet feeding rotation body 4 and the release cum via gears, the pressure plate 2 detaches from the release cum and rises so that the sheet feeding rotation body 4 and the medium 3 are bought into contact with each other. The medium 3 is picked up in accordance with the rotation of the sheet feeding rotation body 4 and separated one by one by a separation claw. The sheet feeding rotation body 4 rotates to send the medium 3 to the platen 10 via conveyance guides 8 and 9.

The medium 3 passes between the conveyance guides 8 and 9, is guided to the conveyor roller 7, and is sent to the platen 10 by this conveyor roller 7 and a pinching roller 11. Thereafter, the medium 3 and the sheet feeding rotation body 4 are separated and back to the stand-by position so that the drive force of the conveyor roller 7 is not transferred.

A sheet feeding rotation body 12 for manual or bypass feeding feeds the medium 3 carried on a bypass tray 13 in response to the printing signal to the conveyor roller 7. The medium 3 fed to the platen 10 passes under the line head 14. The speed of conveying the medium 3 and the timing of discharging the composition and ink are controlled by the signals of electric circuit to form desired images by the image forming device.

In this example, the first discharging device discharges the composition (1) to the medium 3, the first exposing device exposes the composition (1) to the first active energy, and the line head 14 discharges the ink (2).

Figure 4:
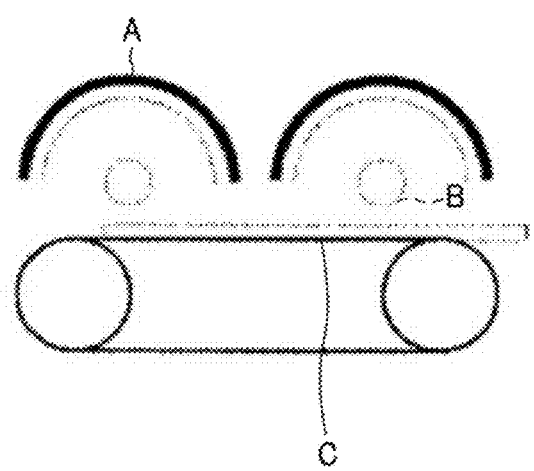
FIG. 4 is a schematic diagram illustrating an example of an exposing device.

Next, another example of the first exposing device is described with reference to FIG. 4. FIG. 4 is a schematic diagram illustrating the inside structure of an example of the UV exposing device externally added to the line head 14 illustrated in FIG. 3. UV exposing units are doubled in this example to achieve faster fixing.

In FIG. 4, A represents a UV exposing unit and B represents a UV lamp, an example of which is a moderate pressure hydrogen lamp (HOK4/120, output power of 400 W, manufactured by Koninklijke Philips N.V.). C represents an electrostatic conveyor belt. The medium is conveyed to the electrostatic conveyor belt C and exposed to UV.

The UV exposing device is disposed upstream of the second discharging device along the conveyance direction of the medium. In FIG. 3, it is disposed upstream of the line head 14. In FIG. 3, the UV exposing device can be positioned at ejecting members 17, 18, and 19 to expose the medium to UV after the ink (2) is discharged.

Second Embodiment

Other embodiments of the image forming device and the image forming method of the present disclosure are described. Descriptions similar to those already described above are omitted.

The image forming device of the present embodiment includes a carriage member that scans a medium and the first discharging device, the first exposing device, and the second discharging device are carried by the carriage member.

Figure 5:
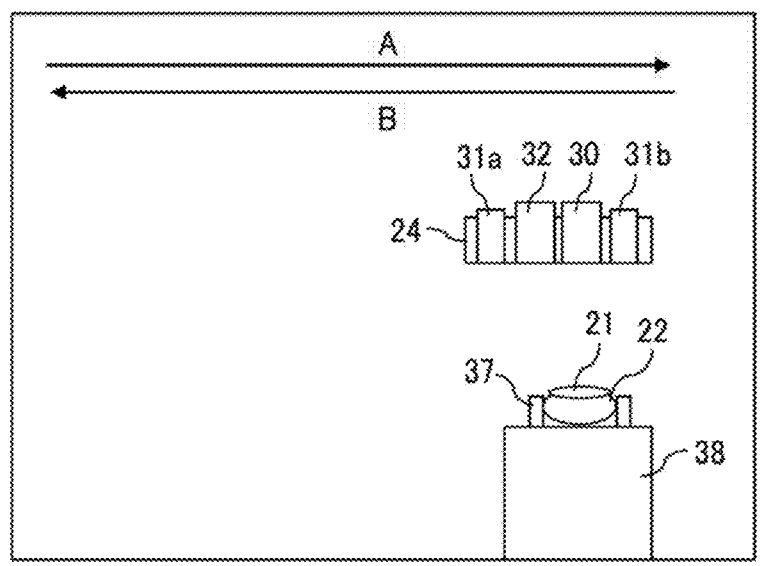
FIG. 5 is a schematic diagram illustrating another example of an image forming device according to an embodiment of the present disclosure.

FIG. 5 is schematic diagram illustrating another example of the image forming device of the present embodiment. In this embodiment, the medium is a nail 21 of a finger 22 and an image forming device 39 forms an image on the nail 21. The image forming device can also form such an image on an artificial nail on the finger nail of the finger 22. The nail 21 in this embodiment includes such an artificial nail. The image forming device includes a carriage member 24, which moves back and forth along the both direction indicated by AB in FIG. 5.

The carriage member 24 includes a first discharging device 30, first exposing device 31a and 31b, and a second discharging device 32. The first discharging device 30 uses an inkjet head while the second discharging device 32 uses a head unit in which inkjet heads for different colors are arranged. They discharge the composition (1) and the ink (2) while the medium 3 moves back and forth using the two exposing devices 31a and 31b.

The image forming device of the present example includes a jig 37 for fixing the finger 22. The finger 22 is firmly fixed by the jig 37 not to move in a loosen manner. Therefore, the composition is discharged to correct discharging positions. The finger 22 can be said to be fixed to the jig 37 or a stage 38. The position of the jig 37 can be adjusted to fit to the finger 22 manually by a user or automatically by an image forming device.

The distance between the nail 21 as the medium and the carriage member 24 can be changed. For example, the stage 38 can be configured to move up or down. The distance between the nail 21 and the carriage member 24 can be changed in accordance with the thickness of an image increasing by repeating discharging the composition (1) and the ink (2).

The image forming device of the present disclosure can form two-dimensional text and images and designed film onto a substrate and images including cured matter or structure having a nail-like form on nail or plastic substrate having a nail-like form. Since the composition (1) for use in the present disclosure has excellent removability and fixability to a nail, it is particularly suitably used as the base coat of an artificial composition. The composition (3) can be used as described later. The composition (3) can enhance the surface hardness so that it can be suitably used as the top coat of an artificial nail composition.

The image forming device of the present embodiment can form a decorative or artificial nail on a medium. Artificial nail includes products that form fake nails made of synthetic resin on natural nail.

In the present embodiment, the composition (1) or the composition (3) can be used as a nail decorative material.

The nail decorative material includes substances such as nail polish, pedicure, sculpture, and gel nail for decorating or reinforcing nails.

The composition (1) and the composition (3) for use in the present embodiment can be referred to as an artificial nail composition. The artificial nail composition for use in the present embodiment is discharged onto a human or animal nail or artificial nail followed by exposure to light to form an artificial nail. Further, the artificial nail formed in the present embodiment can be removed by an organic solvent.

The artificial nail of the present disclosure refers to a layer formed on a human or animal nail or other artificial nail for the purpose of cosmetics and/or protection. Further, it includes a free-form resin substrate (fake nail) for the purpose of dressing and/or protecting the nail as the other artificial nail. In addition, "human and animal nails and other artificial nails" are also simply referred to as "nail".

The shape of the artificial nail is not particularly limited and the artificial nail can be desirably shaped. For example, it may be formed so as to cover the surface of the nail, may be formed only on a part of the nail, may be formed into a larger form than the nail by using nail foam to extend the nail.

In the present embodiment, the thickness of a formed artificial nail can be suitably adjusted. The thickness of the entire artificial nail is not particularly limited as long as it is generally within a range for a general artificial nail. It is preferably from 10 to 2,000 μm in terms of durability and removability.

Such an artificial nail typically employs a configuration having at least one layer of a primer layer, which is a layer between the nail and a base layer for enhancing attachability when the attachment force of the nail only % with the base layer is insufficient), a base layer (layer between nail and color layer for enhancing attachment and preventing color transfer to nail), a color layer (layer containing a coloring material), and a top layer (outermost layer for improving durability, gloss, and aesthetics) in the sequence from the nail. In the present embodiment, the composition (1) forms a primer layer or base layer of an artificial nail and the composition (2) forms a color layer thereof. In the example described later, the composition (3) can form the top layer of an artificial nail.

Figure 6:
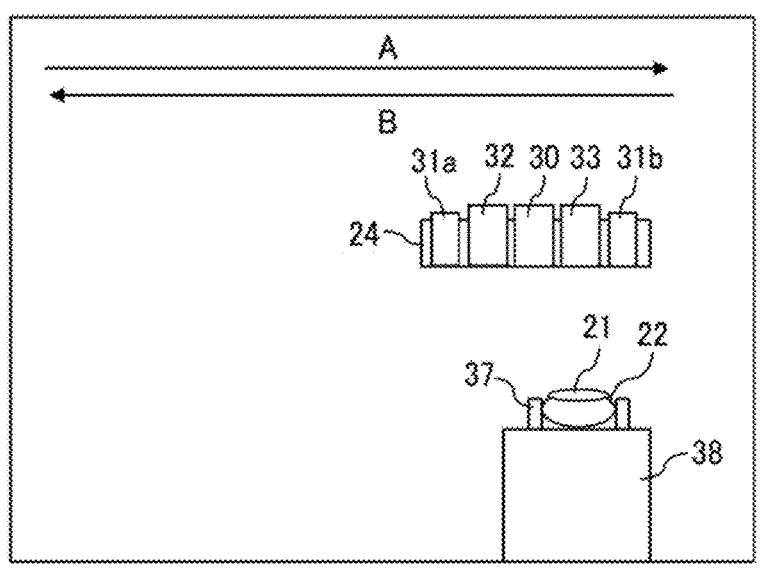
FIG. 6 is a schematic diagram illustrating another example of an image forming device according to an embodiment of the present disclosure.

FIG. 6 is a diagram illustrating another example of the image forming device of the present embodiment.

The carriage member 24 of the image forming device of the present example includes a third discharging device 33 for discharging the composition (3). The disposition of the first discharging device 30, the first exposing devices 31a and 31b, the second discharging device 32, and the third discharging device 33 in the carriage member 24 are not limited to that illustrated in FIG. 6 but can be changed to suit to a particular application.

In this example, the second discharging device 32 discharges the ink (2), then the third discharging device 33 discharges the composition (3), and thereafter the exposing devices 31a and 31b emit active energy. According to the discharging and exposing, an image having a film formed of the composition (3) is formed on the nail 21.

In the case in which the composition (3) has the same formulation as that of the composition (1), the first discharging device 30 can be used as the third discharging device 33.

Figure 7:
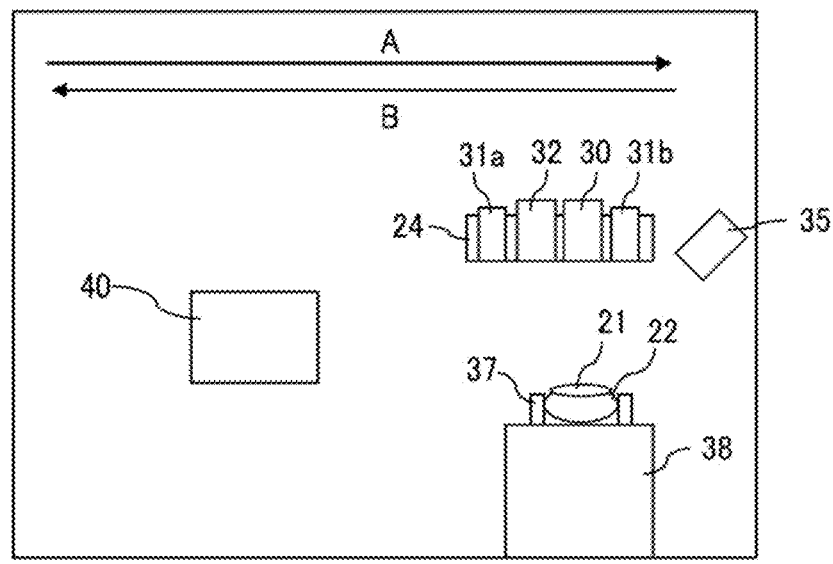
FIG. 7 is a schematic diagram illustrating another example of an image forming device according to an embodiment of the present disclosure.

FIG. 7 is a diagram illustrating another example of the image forming device of the present embodiment.

The image forming device of the present example includes an imaging device 35 capable of detecting the smoothness of the surface of the nail 21 and a polishing device 40 for polishing, smoothing, or flattening the surface of the medium based on the detection result of the imaging device 35. The attachment force between the medium and the film formed of the composition (1) is enhanced by the polishing the surface of the medium using the polishing device 40. This force prevents the image from detaching from the nail 21. By using the imaging device 35, the surface of the nail 21 is not unnecessarily polished so that the nail 21 is prevented from being excessively scraped.

In this example, the imaging device 35 and the polishing device 40 are used together, but the present embodiment is not limited thereto. It is allowed to use the polishing device 40 alone without the imaging device 35. The device for detecting the smoothness or flatness of the surface of the nail 21 is preferably the imaging device 35 but not limited thereto. Detecting the smoothness of the surface of a medium is also described as detecting the roughness of the surface of a medium.

The first discharging device 30 in the present example preferably discharges the first active energy curing composition (1) to a medium when the surface of the medium has smoothness of flatness of a threshold or greater. The first discharging device 30 in the present example preferably does not discharge the first active energy curing composition (1) to a medium when the surface of the medium has a smoothness below the predetermined threshold. It discharges the composition (1) after the polishing device 40 polishes the surface of the medium to the threshold or greater. In this configuration, the surface of a medium is flattened by the polishing device 40 only when it is necessary so that the nail 21 is prevented from being excessively scraped.

Whether the polishing device 40 polishes the surface of a medium is suitably determined depending on the situation and can be changed without a limitation. The threshold can be the difference between the peak and the bottom of the surface of the nail 21. For example, the smoothing operation can be set to start when the difference is 20 µm or greater.

The polishing device 40 is not particularly limited and can be changed suitably to suit to a particular application. Using a file is preferable. Files are preferable to efficiently polish the surface of a medium. The smoothness of a file can be suitably changed in accordance with the hardness of the surface of a medium.

It is allowable to change how to move a file, which can be rotated and moved back and forth. It is preferable to polish the surface of a medium by rotating a file attached to a rotatable support bar. The shape of a file is not particularly limited, and can be changed appropriately. It can be a sheet-like form, a cuboid, a cubic, or a sphere.

Figure 8:
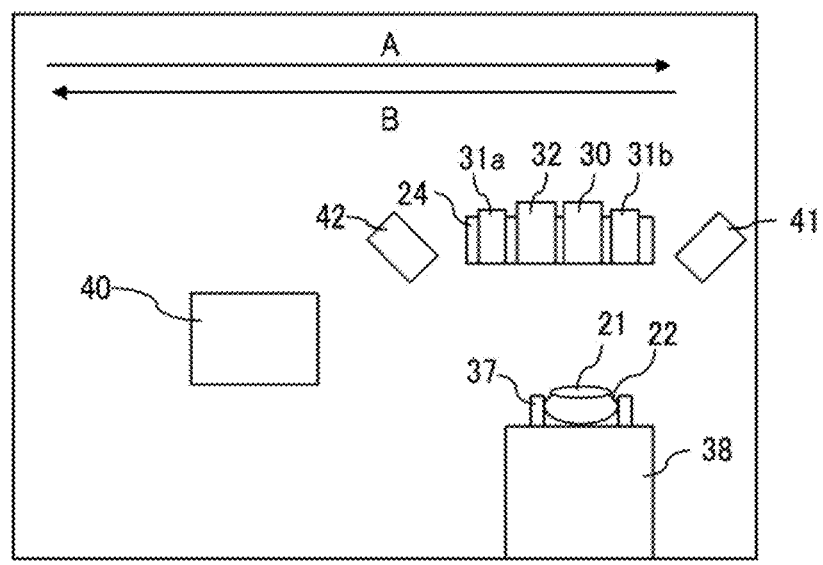
FIG. 8 is a schematic diagram illustrating another example of an image forming device according to an embodiment of the present disclosure.

The polishing device 40 is disposed at a position illustrated in FIG. 8 or any other suitable position. The smoothing device 40 can be configured to move to the position corresponding to the nail 21. Alternatively, the stage 38 can be configured to move to the position corresponding to the smoothing device 40.

The imaging device 35 can be a camera. The imaging device 35 is disposed at a position illustrated in FIG. 8 or any other suitable position. It can be fixed inside an image forming device or carried by the carriage member 24. The imaging device 35 can be disposed adjacent to the exposing device when disposed in the carriage member 24. The number of the imaging device 35 can be suitably changed; it can be one or more.

When the imaging device 35 is used, it is preferable that the first discharging device 30 and the exposing devices 31a and 31b repeat discharging the first active energy curing composition (1) and exposing the composition (1) to active energy until the surface of a medium reaches the threshold. In this case, the roughness of a nail can be compensated so that the ink (2) can be discharged to the smooth base.

FIG. 8 is a diagram illustrating another example of the image forming device of the present embodiment.

The image forming device of the present example includes an image acquisition device 41 for acquiring an image of the first active energy curing composition (1) after the composition (1) is exposed to active energy by the exposing device 31a and 31b and a temperature detector 42 for detecting the temperature of the image in a non-contact manner. The second discharging device 32 in the present example is controlled on whether to discharge the ink (2) based on the information acquired or detected by the image acquisition device 41 and/or the temperature detector 42.

According to the present example, the image acquisition device 41 and the temperature detector 42 acquire the information on the degree of curing of the composition (1). The second discharging device 32 is controlled on whether to discharge the ink (2) based on the information. That is, when the composition (1) does not cure sufficiently, the ink (2) is not discharged. The ink (2) is prevented from blurring, thereby forming a clear image.

The image acquisition device 41 in the present example acquires an image of the composition (1) after it is exposed to active energy. It can be a camera. The imaging device 35 mentioned above can be used as the image acquisition device 41 of the present example. The image acquisition device 41 is disposed at a position illustrated in FIG. 8 or any other suitable position. It can be fixed inside an image forming device or carried by the carriage member 24.

The temperature detector 42 detects and acquires the temperature of the composition (1) after it is exposed to active energy.

The temperature detector 42 is disposed at a position illustrated in FIG. 8 or any other suitable position.

It can be fixed inside an image forming device or carried by the carriage member 24.

Whether to discharge the ink (2) can be changed depending on the situation and is not particularly limited. Whether to discharge the ink (2) is determined depending on the composition (1) and active energy. For example, it can be determined to discharge the ink when the smoothness, flatness, of an acquired image acquired by the image acquisition device 41 satisfies a threshold, for example, the difference between the peak and the bottom of the image is 20 μm or less, and the temperature of the surface of the film detected by the temperature detector 42 is, for example, from 20 to 40 degrees C. Alternatively, the ink (2) is not discharged when the flatness does not satisfy a threshold, for example, the difference between the peak and the bottom of the image is greater than 20 μm or when the temperature of the surface of the film detected by the temperature detector 42 is, for example, lower than 20 degrees C.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but are not limited thereto. "Parts" represents parts by mass and "percent" represents percent by mass unless otherwise specified in the following description.

Examples 1 to 26 and Comparative Examples 1 to 11

Components

The abbreviations, compound names, manufacturers, and products of the raw materials used for preparing the compositions are shown in Tables 1 and 2. A1-1 to A1-3 as the acrylamide compound (A1) were synthesized by the methods described in Synthesis Examples 1 to 3. The synthesized compound was identified according to nuclear magnetic resonance spectroscopy (by JNM-ECX500, manufactured by JEOL Ltd.) and purity was measured by gas chromatography (by GCMS-QP2010 Plus, manufactured by Shimadzu Corporation). These chemical analyses were conventionally conducted.

Synthesis Example 1

Synthesis of N-acryloyl-N-methylglycine Methyl Ester (A1-1)

A total of 0.30 mol of N-methylglycine methyl ester hydrochloride (reagent, manufactured by Sigma Aldrich Japan Co., Ltd.), 0.45 mol of potassium carbonate (reagent, manufactured by Kanto Chemical Co., Inc.), and 400 mL of water were stirred and mixed at a temperature range of from 0 to 10 degrees C. Thereafter, 0.33 mol of acrylic acid chloride (reagent, manufactured by Wako Pure Chemical Industries, Ltd.) was slowly added dropwise while the temperature was maintained. After completion of the addition and three-time extraction with 400 mL of ethyl acetate (reagent, manufactured by Kanto Chemical Co., Inc.), the resulting liquid was rinsed with 400 mL of water including an ethyl acetate layer. Ethyl acetate was distilled away at 40 degrees C. under a reduced pressure to obtain 0.20 mol of the target N-acryloyl-N-methylglycine methyl ester (A1-1) as an almost colorless and transparent liquid. Purity was 98.3 percent by mass.

N-acryloyl-N-methyl glycine methyl ester (A1-1) is a known compound (CAS registration number 72065-23-7) and its molecular weight was 157.2.

Synthesis Example 2

Synthesis of N-acryloyl-N-methyl Glycine Methyl Alanine Methyl Ester (A1-2)

A total of 0.22 mol of the target N-acryloyl-N-methylalanine methyl ester (A1-2) was obtained as an almost colorless and transparent liquid in the same manner as in Synthesis Example 1 except that N-methylglycine methyl ester hydrochloride was changed to N-methylalanine methyl ester hydrochloride (reagent, manufactured by Tokyo Chemical Industry Co. Ltd.). Purity was 98.5 percent by mass.

The molecular weight of N-acryloyl-N-methyl alanine methyl ester (A1-2) was 171.2.

Synthesis Example 3

Synthesis of N-Acryloylpiperidine-4-carboxylic Acid Ethyl (A1-3)

A total of 0.27 mol of the target N-acryloylpiperidine-4-carboxylic acid ethyl ester (A1-3) was obtained as an almost colorless and transparent liquid in the same manner as in Synthesis Example 1 except that N-methylglycine methyl ester hydrochloride was changed to piperidine-4-carboxylic acid ethyl (reagent, manufactured by Tokyo Chemical Industry Co. Ltd.). Purity was 99.2 percent by mass.

The molecular weight of N-acryloylpiperidine-4-carboxylic acid ethyl ester (A1-3), which is a known compound (CAS registration number 845907-79-1), was 211.3.

Manufacturing of First Active Energy Curing Composition (1)

According to the prescriptions shown in Tables 3 to 7, (meth)acrylamide compound (A), acrylamide compound (A1), other monomer (E), polymerization initiator (C), and hydrogen donor (D) were suitably selected and mixed and dispersed with a dissolver (DISPERMAT-FE). The resulting dispersion was filtered with a 3 μm filter to obtain a first active energy curing composition (1) (active energy curing base coat liquid).

The proportion (percent by mass) of each component is shown in each Table.

Preparation of Ink (2)

According to the prescriptions shown in Tables 8 to 10, the ink (2) (aqueous ink for inkjet printing) was prepared.

The materials (i) to (iii) were as follows.
(i) Pigment {Non-decorative pigment (surfactant dispersed pigment)}
(ii) Surfactant
(iii) Water-soluble organic solvent
(iv) Deionized water
(v) pH regulator
(Vi) Preservative
(vii) Corrosion inhibitor Of the materials mentioned above, (iv) deionized water, (iii) water-soluble organic solvent organic solvent, (vi) preservative, and (vii) corrosion inhibitor were dispersed and stirred by a dissolver (DISPERMAT-FE) to prepare a liquid dispersion. (i) pigment and (ii) surfactant were added to this liquid dispersion, followed by dispersion and stirring. (v) pH regulator was further added to the resulting dispersion to prepare a pigment dispersion. The pigment dispersion was filtered with 3 μm filter to obtain ink (2).

The proportion (percent by mass) of each component is shown in each Table.

The abbreviations shown in each Table were as follows.

Pigment
  C=cyan
  M=magenta
  Y=yellow
  B=black
  PB15:4=C.I. Pigment Blue 15:4 (phthalocyanine blue)
  PR122=C.I. Pigment Red 122 (dimethyl quinacridone)
  PY74=C.I. Pigment Yellow 74 (monoazo)
  Acidic CB=acidic carbon black (carbon black)
Surfactant
  TEGO Wet 270 (polyether-modified siloxane compound (manufactured by Evonik Industries AG)
Water-soluble organic solvent
  MBD=3-methyl-1,3-butane diol
  EHD=2-ethyl-1,3-hexane diol
pH regulator
  TEA=triethanol amine (organic amine)
Preservative
  BIT=1,2-benzisothiazoline-3-one
Corrosion Inhibitor
  BTA=benzotriazole Manufacturing of Second Active Energy Curing Composition (3)

According to the prescriptions shown in Tables 4 to 7, (meth)acrylamide compound (A), acrylamide compound (A1), polyfunctional compound or polymerizable oligomer (B), polymerization initiator (C), and hydrogen donor (D) were suitably selected and mixed and dispersed with a dissolver (DISPERMAT-FE). The resulting dispersion was filtered with a 3 μm filter to obtain a second active energy curing composition (3) (active energy curing top coat liquid).

The proportion (percent by mass) of each component is shown in each Table.

In the Tables below, "liquid type 1" means the first active energy curing composition (1) "liquid type 2" means the ink (2), and "liquid type 3" means the second active energy curing composition (3).

TABLE 1

| | Abbreviation | Compound or structure | Manufacturer and product |
|---|---|---|---|
| (Meth)acrylamide compound A | A-1 | Acryloylmorpholine | ACMO, manufactured by KJ Chemicals Corporation |
| | A-2 | Diiso propyl acrylamide | NIPAM, manufactured by KJ Chemicals Corporation |
| | A-3 | Diacetone acrylamide | DAAM, manufactured by KH Neochem Co., Ltd. |
| Acrylamide Compound (A1) | A1-1 | [structure] | (Refer to Synthesis Example 1) |
| | A1-2 | [structure] | (Refer to Synthesis Example 2) |
| | A1-3 | [structure] | (Refer to Synthesis Example 3) |
| Polyfunctional polymerizable compound or polymerizable oligomer (B) | B-1 | [structure] | TMPT, manufactured by Shin-Nakamura Chemical Co., Ltd. |

TABLE 1-continued

| Abbreviation | Compound or structure | Manufacturer and product |
|---|---|---|
| B-2 | 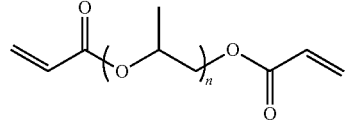 n = 12 | APG-700, manufactured by Shin-Nakamura Chemical Co., Ltd. |
| B-3 | 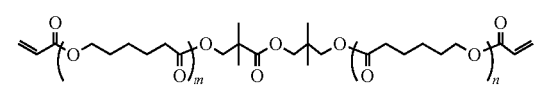 | HX-620, manufactured by Nippon Kayaku Co., Ltd. |
| B-4 | 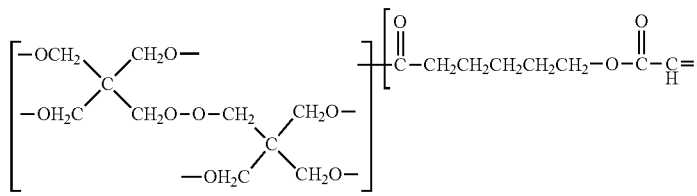 | DPCA-60, manufactured by Nippon Kayaku Co., Ltd. |
| B-5 | 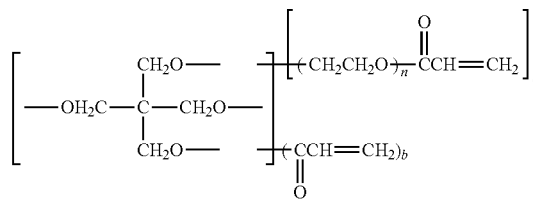 a + b = 4, $\bar{n}$ = 4 | RP-1040, manufactured by Nippon Kayaku Co., Ltd. |
| B-6 | Polyglycerine-based acrylate | SA-TE6, manufactured by Sakamoto Yakuhin kogyo Co., Ltd. |
| B-7 | Polyglycerine-based acrylate | SA-TE60, manufactured by Sakamoto Yakuhin kogyo Co., Ltd. |
| B-8 | Aliphatic urethane acrylate oligomer | EBECRYL 4666, manufactured by DAICEL-ALLNEX LTD. |
| B-9 | Urethane acrylate oligomer | CN968, manufactured by Sartomer Company |
| Polymerizable compounds (E) other than A and B — E-1 | 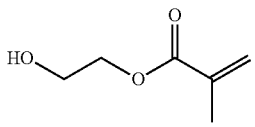 | 2-hydroxyethyl methacrylate, manufacture by Tokyo Chemical industry Co., Ltd. |
| E-2 | Acrylic acid 2-[{(butylamino)carbonyl}oxy]ethylester | Biscoat #216, manufactured by OSAKA ORGANIC CHEMICAL INDUSTRY LTD. |

TABLE 2

| Abbreviation | Compound or structure | Manufacturer and product |
|---|---|---|
| Polymerization initiator (C) — C-1 | Bis(2,4,6-trimethyl benzoyl)phenylphosphine oxide | IRGACURE 819, manufactured by BASF Japan Ltd. |
| C-2 | 2,4,6-trimethylbenzoyl-diphenyl-phosphine oxide | IRGACURE TPO manufactured by BASF Japan Ltd. |
| C-3 | Mixture of oxy-phenyl-acetic acid2-[2-oxo-2-phenyl-acetone-ethoxy]- | IRGACURE 754, manufactured by |

TABLE 2-continued

| | Abbreviation | Compound or structure | Manufacturer and product |
|---|---|---|---|
| | | ethylester and oxy-phenyl-acetic acid2-[2-hydroxy-ethoxy]-ethyl ester | BASF Japan Ltd. |
| | C-4 | 2-[4-(methylthio)benzoyl]-2-(4-morpholinyl)propane | IRGACURE 907, manufactured by BASF Japan Ltd. |
| | C-5 | Phenyl(2,4,6-trimethyl benzoyl)phosphinic acid ethyl | TPO-L, manufactured by IGM Japan Ltd. |
| | C-6 | [structure shown; m + n = 7-10] | Esacure 3644, manufactured by IGM Japan Ltd. |
| Hydrogen donor (D) | D-1 | 2-Dimethyl amino benzoic acid methyl | Manufactured by Tokyo Chemical Industry Co. Ltd.) |
| | D-2 | 4-Dimethyl amino benzoic acid ethyl | KAYACURE, manufactured by Nippon Kayaku Co., Ltd. |
| | D-3 | Bis-N,N-[4-(dimethylaminobenzoyl)oxyethylene-1-yl]-methyl amine | Esacure A198, manufactured by IGM Japan Ltd. |
| | D-4 | Polyethylene glycol (200)bis(4-dimethylamino benzoic acid methyl) | Omnipol ASA, manufactured by IGM Japan Ltd. |
| Other components | Polymerization inhibitor | 4-methoxyphenol | Methoquinone, manufactured by Seiko Chemical Co., Ltd. |
| | Surfactant | Silicone-based surfactant | BYK-UV3510, manufactured by BYK Japan KK. |

TABLE 3

| Liquid type | Example | | | | | | | | | |
|---|---|---|---|---|---|---|---|---|---|---|
| | 1 (1) | 2 (1) | 3 (1) | 4 (1) | 5 (1) | 6 (1) | 7 (1) | 8 (1) | 9 (1) | 10 (1) |
| A-1 | 30.0 | | | | | | 30.0 | | | |
| A-2 | | 30.0 | | | | | | | | |
| A-3 | 10.0 | | 30.0 | | | | 9.8 | 9.8 | | |
| A1-1 | | 10.0 | | 30.0 | 10.0 | 10.0 | 10.0 | 20.0 | 30.0 | 10.0 |
| A1-2 | 9.4 | | 10.0 | | 30.0 | | | | | 10.0 |
| A1-3 | | 10.0 | 10.0 | 30.0 | 10.0 | 30.0 | | 10.0 | 10.0 | 20.0 |
| B-1 | | | | | | | | | | |
| B-2 | 30.0 | | 10.0 | 10.0 | | | 20.0 | 20.0 | 14.8 | 10.0 |
| B-3 | 10.0 | 20.0 | | 19.4 | 30.0 | 9.4 | | 10.0 | 20.0 | |
| B-4 | | | | | 9.4 | 5.0 | | | | |
| B-5 | | 9.4 | | | | 5.0 | 10.0 | 10.0 | | |
| B-6 | | | | | | | | | | |
| B-7 | | 10.0 | 29.4 | | | 30.0 | | | | 24.8 |
| B-8 | | | | | | | | | | |
| B-9 | | | | | | | | | | |
| E-1 | | | | | | | 10.0 | 10.0 | 10.0 | 10.0 |
| E-2 | | | | | | | | | 5.0 | 5.0 |
| C-1 | | | | | | | 10.0 | | | |
| C-2 | 10.0 | 10.0 | 10.0 | | | | | 10.0 | | |
| C-3 | | | | | | | | | 10.0 | |
| C-4 | | | | | | | | | | 10.0 |
| C-5 | | | | 10.0 | 10.0 | 10.0 | | | | |
| C-6 | 0.2 | 0.2 | 0.2 | 0.2 | 0.2 | 0.2 | | | | |
| D-1 | 0.2 | 0.2 | | | | 0.2 | | | | |
| D-2 | | | 0.2 | | | | | | | |

TABLE 3-continued

| Liquid type | Example 1 (1) | 2 (1) | 3 (1) | 4 (1) | 5 (1) | 6 (1) | 7 (1) | 8 (1) | 9 (1) | 10 (1) |
|---|---|---|---|---|---|---|---|---|---|---|
| D-3 | | | | 0.2 | | | | | | |
| D-4 | | | | | 0.2 | | | | | |
| Polymerization inhibitor | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 |
| Total | 100.0 | 100.0 | 100.0 | 100.0 | 100.0 | 100.0 | 100.0 | 100.0 | 100.0 | 100.0 |

TABLE 4

| Liquid type | 11 (1) | 11 (3) | 12 (1) | 12 (3) | 13 (1) | 13 (3) | 14 (1) | 14 (3) | 15 (1) | 15 (3) | 16 (1) | 16 (3) |
|---|---|---|---|---|---|---|---|---|---|---|---|---|
| A-1 | 30.0 | 30.0 | | 20.0 | 40.0 | | | | | | 30.0 | |
| A-2 | | | 30.0 | 9.4 | | | | | | | | 30.0 |
| A-3 | 10.0 | 10.0 | 30.0 | 30.0 | | | | | | | 10.0 | |
| A1-1 | | | 10.0 | | | | 30.0 | 30.0 | 10.0 | 10.0 | | 10.0 |
| A1-2 | 9.4 | | | | 10.0 | | | | 30.0 | 30.0 | 9.4 | |
| A1-3 | | 9.4 | 10.0 | | 10.0 | | 30.0 | 30.0 | 10.0 | 10.0 | | 10.0 |
| B-1 | | 20.0 | | | | 20.0 | | 20.0 | | 10.0 | | 20.0 |
| B-2 | 30.0 | | | | 10.0 | | 10.0 | | | | 30.0 | |
| B-3 | 10.0 | | 20.0 | | | | | 19.4 | 30.0 | | 10.0 | |
| B-4 | | 5.0 | | 5.0 | | | | | | 9.4 | 10.0 | 5.0 |
| B-5 | | | 9.4 | | | | | | | | | |
| B-6 | | 11.0 | | 25.0 | | 20.0 | | 9.4 | | 10.0 | | 10.4 |
| B-7 | | | 10.0 | | 29.4 | | | | | | | |
| B-8 | | 2.0 | | | | 4.0 | | | | 5.0 | | 2.0 |
| B-9 | | 2.0 | | | | 5.4 | | | | 4.6 | | 2.0 |
| E-1 | | | | | | | | | | | | |
| E-2 | | | | | | | | | | | | |
| C-1 | | | | | | | | | | | | |
| C-2 | 10.0 | 10.0 | 10.0 | 10.0 | 10.0 | 10.0 | | | | | 10.0 | 10.0 |
| C-3 | | | | | | | | | | | | |
| C-4 | | | | | | | | | | | | |
| C-5 | | | | | | | 10.0 | 10.0 | 10.0 | 10.0 | | |
| C-6 | 0.2 | 0.2 | 0.2 | 0.2 | 0.2 | 0.2 | 0.2 | 0.2 | 0.2 | 0.2 | 0.2 | 0.2 |
| D-1 | 0.2 | 0.2 | 0.2 | 0.2 | | | | | | | 0.2 | 0.2 |
| D-2 | | | | | 0.2 | 0.2 | | | | | | |
| D-3 | | | | | | | 0.2 | 0.2 | | | | |
| D-4 | | | | | | | | | 0.2 | | | |
| Polymerization inhibitor | 0.1 | 0.1 | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 | 0.1 | 0.1 |
| Total | 100.0 | 100.0 | 100.0 | 100.0 | 100.0 | 100.0 | 100.0 | 100.0 | 100.0 | 100.0 | 100.0 | 100.0 |

TABLE 5

| Liquid type | 17 (1) | 17 (3) | 18 (1) | 18 (3) | 19 (1) | 19 (3) | 20 (1) | 20 (3) | 21 (1) | 21 (3) | 22 (1) | 22 (3) |
|---|---|---|---|---|---|---|---|---|---|---|---|---|
| A-1 | | | | | 30.0 | | | | 30.0 | 30.0 | | 20.0 |
| A-2 | | | | | | | | | | | 30.0 | 9.4 |
| A-4 | 30.0 | | | | 9.8 | 9.8 | | | 10.0 | 10.0 | | 30.0 |
| A1-1 | | 30.0 | 10.0 | 10.0 | 10.0 | 20.0 | 30.0 | 10.0 | | | 10.0 | |
| A1-2 | 10.0 | | 30.0 | | | | | 10.0 | 9.4 | | | |
| A1-3 | 10.0 | 20.4 | 10.0 | 30.0 | | 10.0 | 10.0 | 20.0 | | 9.4 | 10.0 | |
| B-1 | | 20.0 | | 20.0 | | 20.0 | 15.8 | | | 31.0 | | |
| B-2 | 10.0 | | | | 20.0 | | 14.8 | | 30.0 | | | |
| B-3 | | | 30.0 | | | | 20.0 | | 10.0 | | 20.0 | |
| B-4 | | 5.0 | 9.4 | 5.0 | | 5.0 | | 5.0 | | 5.0 | | 5.0 |
| B-5 | | | | | 10.0 | | | | | | 9.4 | |
| B-6 | | | | 10.4 | | 11.0 | | | | | | 25.0 |
| B-7 | 29.4 | | | | | | | | | | 10.0 | |

TABLE 5-continued

| Liquid type | Ex 17 (1) | Ex 17 (3) | Ex 18 (1) | Ex 18 (3) | Ex 19 (1) | Ex 19 (3) | Ex 20 (1) | Ex 20 (3) | Ex 21 (1) | Ex 21 (3) | Ex 22 (1) | Ex 22 (3) |
|---|---|---|---|---|---|---|---|---|---|---|---|---|
| B-8 | | 2.0 | | 2.0 | | 2.0 | | 2.0 | | 2.0 | | |
| B-9 | | 2.0 | | 2.0 | | 2.0 | | 2.0 | | 2.0 | | |
| E-1 | | | | | 10.0 | 10.0 | 10.0 | 10.0 | | | | |
| E-2 | | | | | | | 5.0 | 5.0 | | | | |
| C-1 | | | | | 10.0 | | | | | | | |
| C-2 | 10.0 | 10.0 | | 10.0 | | 10.0 | | 10.0 | 10.0 | 10.0 | 10.0 | 10.0 |
| C-3 | | | | | | | 10.0 | | | | | |
| C-4 | | | | | | | | 10.0 | | | | |
| C-5 | | 10.0 | 10.0 | 10.0 | | | | | | | | |
| C-6 | 0.2 | 0.2 | 0.2 | 0.2 | | | | | 0.2 | 0.2 | 0.2 | 0.2 |
| D-1 | | | | 0.2 | | | | | 0.2 | 0.2 | 0.2 | 0.2 |
| D-2 | 0.2 | | | | | | | | | | | |
| D-3 | | 0.2 | | | | | | | | | | |
| D-4 | | | 0.2 | | | | | | | | | |
| Polymerization inhibitor | 0.1 | 0.1 | 0.1 | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 | 0.1 | 0.1 | 0.1 |
| Total | 100.0 | 100.0 | 100.0 | 100.0 | 100.0 | 100.0 | 100.0 | 100.0 | 100.0 | 100.0 | 100.0 | 100.0 |

TABLE 6

| Liquid type | Ex 23 (1) | Ex 23 (3) | Ex 24 (1) | Ex 24 (3) | Ex 25 (1) | Ex 25 (3) | Ex 26 (1) | Ex 26 (3) |
|---|---|---|---|---|---|---|---|---|
| A-1 | | 40.0 | | | | | 20.0 | |
| A-2 | | | | | | | 10.0 | 20.0 |
| A-3 | 30.0 | | | | | | 9.4 | 19.6 |
| A1-1 | | | 30.0 | 30.0 | 10.0 | 10.0 | 10.0 | 10.0 |
| A1-2 | 10.0 | | | | 30.0 | 30.0 | 30.0 | 30.0 |
| A1-3 | 10.0 | | 30.0 | 30.0 | 10.0 | 10.0 | 10.0 | 10.0 |
| B-1 | | 20.0 | | 20.0 | | 10.0 | | |
| B-2 | 10.0 | | 10.0 | | | | | |
| B-3 | | | | 19.4 | 30.0 | | | |
| B-4 | | | | | 9.4 | 10.0 | | |
| B-5 | | | | | | | | |
| B-6 | | 20.0 | | 9.4 | | 10.0 | | |
| B-7 | 29.4 | | | | | | | |
| B-8 | | 4.0 | | | | 5.0 | | |
| B-9 | | 5.4 | | | | 4.6 | | |
| E-1 | | | | | | | | |
| E-2 | | | | | | | | |
| C-1 | | | | | | | | |
| C-2 | 10.0 | 10.0 | | | | | | |
| C-3 | | | | | | | | |
| C-4 | | | | | | | | |
| C-5 | | | | | 10.0 | 10.0 | 10.0 | 10.0 |
| C-6 | 0.2 | 0.2 | 0.2 | 0.2 | 0.2 | 0.2 | 0.2 | 0.2 |
| D-1 | | | | | | | | |
| D-2 | 0.2 | 0.2 | | | | | | |
| D-3 | | | 0.2 | 0.2 | | | | |
| D-4 | | | | | 0.2 | | 0.2 | |
| Polymerization inhibitor | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 |
| Total | 100.0 | 100.0 | 100.0 | 100.0 | 100.0 | 100.0 | 100.0 | 100.0 |

TABLE 7

| Liquid type | Comp 1 (1) | Comp 2 (1) | Comp 3 (1) | Comp 4 (1) | Comp 5 (1) | Comp 6 (1) | Comp 6 (3) |
|---|---|---|---|---|---|---|---|
| A-1 | | | | | | | |
| A-2 | | | | | | | |
| A-3 | | | | | | | |
| A1-1 | | | | | | | |
| A1-2 | | | | | | | |
| A1-3 | | | | | | | |
| B-1 | | | | | | | 20.0 |
| B-2 | 29.4 | | 10.0 | | 40.0 | 29.4 | |
| B-3 | 10.0 | 20.0 | | 39.4 | 30.0 | 10.0 | |
| B-4 | | | | 10.0 | 9.4 | | 5.0 |
| B-5 | | 9.4 | | | 10.0 | | |
| B-6 | | | | | 10.0 | | 10.4 |
| B-7 | | 10.0 | 29.4 | | 30.0 | | |
| B-8 | | | | | | | 2.0 |
| B-9 | | | | | | | 2.0 |
| E-1 | 50.0 | | 20.0 | | | 20.0 | 50.0 |

TABLE 7-continued

| | | | | | | | |
|---|---|---|---|---|---|---|---|
| E-2 | | 50.0 | 30.0 | | | 30.0 | |
| C-1 | | | | | | | |
| C-2 | 10.0 | 10.0 | 10.0 | | | 10.0 | 10.0 |
| C-3 | | | | | | | |
| C-4 | | | | | | | |
| C-5 | | | | 10.0 | 10.0 | | |
| C-6 | 0.2 | 0.2 | 0.2 | 0.2 | 0.2 | 0.2 | 0.2 |
| D-1 | 0.2 | 0.2 | | | | 0.2 | 0.2 |
| D-2 | | | 0.2 | | | | |
| D-3 | | | | 0.2 | | | |
| D-4 | | | | | 0.2 | | |
| Polymerization inhibitor | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 |
| Total | 100.0 | 100.0 | 100.0 | 100.0 | 100.0 | 100.0 | 100.0 |

| | Comparative Example | | | | | | | | |
|---|---|---|---|---|---|---|---|---|---|
| Liquid | 7 | | 8 | | 9 | | 10 | | 11 |
| type | (1) | (3) | (1) | (3) | (1) | (3) | (1) | (3) | (1) |
| A-1 | | | | | | | | | 30.0 |
| A-2 | | | | | | | | | |
| A-3 | | | | | | | | | 10.0 |
| A1-1 | | | | | | | | | |
| A1-2 | | | | | | | | | 9.4 |
| A1-3 | | | | | | | | | |
| B-1 | | | | 20.0 | | 20.0 | | 10.0 | |
| B-2 | 30.0 | | 40.0 | | 10.0 | 40.0 | | | 30.0 |
| B-3 | 40.0 | | | | 19.4 | | 30.0 | | 10.0 |
| B-4 | | 14.4 | 20.0 | | | | 9.4 | 20.0 | |
| B-5 | 9.4 | | | | 20.0 | 20.0 | 10.0 | | |
| B-6 | | 25.0 | | 14.0 | | 9.4 | | 10.0 | |
| B-7 | 10.0 | | 29.4 | | | | | | |
| B-8 | | | | 10.0 | | | | 5.0 | |
| B-9 | | | | 5.4 | | | | | 4.6 |
| E-1 | | 20.0 | | | 20.0 | | 20.0 | 20.0 | |
| E-2 | | 30.0 | | 40.0 | 20.0 | | 20.0 | 20.0 | |
| C-1 | | | | | | | | | |
| C-2 | 10.0 | 10.0 | 10.0 | 10.0 | | | | | 10.0 |
| C-3 | | | | | | | | | |
| C-4 | | | | | | | | | |
| C-5 | | | | | 10.0 | 10.0 | 10.0 | 10.0 | |
| C-6 | 0.2 | 0.2 | 0.2 | 0.2 | 0.2 | 0.2 | 0.2 | 0.2 | 0.2 |
| D-1 | 0.2 | 0.2 | | | | | | | 0.2 |
| D-2 | | | 0.2 | 0.2 | | | | | |
| D-3 | | | | | 0.2 | 0.2 | | | |
| D-4 | | | | | | | 0.2 | | |
| Polymerization inhibitor | 0.1 | 0.1 | 0.1 | 0.1 | 0.1 | 0.1 | 0.1 | 0.1 | 0.1 |
| Surfactant | 0.1 | 0.1 | 0.1 | 0.1 | 0.1 | 0.1 | 0.1 | 0.1 | 0.1 |
| Total | 100.0 | 100.0 | 100.0 | 100.0 | 100.0 | 100.0 | 100.0 | 100.0 | 100.0 |

TABLE 8

| | | Example | | | | | | | |
|---|---|---|---|---|---|---|---|---|---|
| | | 1 | 2 | 3 | 4 | 5 | 6 | 7 | 8 |
| | Liquid type | (2) | (2) | (2) | (2) | (2) | (2) | (2) | (2) |
| Pigment | C: PB15:4 | 5.0 | | | | | | | |
| | M: PR122 | | 5.0 | | | | | | |
| | Y: PY74 | | | 5.0 | | | | | |
| | B: acidic CB | | | | 5.0 | | | | |
| | W: titanium dioxide | | | | | 5.0 | | | |
| Dyes | C: Blue No. 1 | | | | | | 5.0 | | |
| | M: Red No. 3 | | | | | | | 5.0 | |
| | Y: Yellow No. 4 | | | | | | | | 5.0 |
| Surfactant | TEGO Wet270 | 0.1 | 0.1 | 0.1 | 0.1 | 0.1 | 0.1 | 0.1 | 0.1 |
| Water-soluble organic solvent | MBD | 10.0 | 10.0 | 10.0 | 10.0 | 10.0 | 10.0 | 10.0 | 10.0 |
| | EHD | 5.0 | 5.0 | 5.0 | 5.0 | 5.0 | 5.0 | 5.0 | 5.0 |
| | Glycerin | 25.0 | 25.0 | 25.0 | 25.0 | 25.0 | 25.0 | 25.0 | 25.0 |
| pH regulator | TEA | 0.5 | 0.5 | 0.5 | 0.5 | 0.5 | 0.5 | 0.5 | 0.5 |
| Water | Deionized water | 54.1 | 54.1 | 54.1 | 54.1 | 54.1 | 54.1 | 54.1 | 54.1 |

TABLE 8-continued

| | | | | | | | | | |
|---|---|---|---|---|---|---|---|---|---|
| Preservative | BIT | 0.2 | 0.2 | 0.2 | 0.2 | 0.2 | 0.2 | 0.2 | 0.2 |
| Corrosion Inhibitor | BTA | 0.1 | 0.1 | 0.1 | 0.1 | 0.1 | 0.1 | 0.1 | 0.1 |
| | Total | 100.0 | 100.0 | 100.0 | 100.0 | 100.0 | 100.0 | 100.0 | 100.0 |

| | | Example | | | | | | | |
|---|---|---|---|---|---|---|---|---|---|
| | Liquid type | 9 (2) | 10 (2) | 11 (2) | 12 (2) | 13 (2) | 14 (2) | 15 (2) | 16 (2) |
| Pigment | C: PB15:4 | | | 5.0 | | | | | |
| | M: PR122 | | | | 5.0 | | | | |
| | Y: PY74 | | | | | 5.0 | | | |
| | B: acidic CB | 5.0 | | | | | 5.0 | | |
| | W: titanium dioxide | | 5.0 | | | | | 5.0 | |
| Dyes | C: Blue No. 1 | | | | | | | | 5.0 |
| | M: Red No. 3 | | | | | | | | |
| | Y: Yellow No. 4 | | | | | | | | |
| Surfactant | TEGO Wet270 | 0.1 | 0.1 | 0.1 | 0.1 | 0.1 | 0.1 | 0.1 | 0.1 |
| Water-soluble organic solvent | MBD | 10.0 | 10.0 | 10.0 | 10.0 | 10.0 | 10.0 | 10.0 | 10.0 |
| | EHD | 5.0 | 5.0 | 5.0 | 5.0 | 5.0 | 5.0 | 5.0 | 5.0 |
| | Glycerin | 25.0 | 25.0 | 25.0 | 25.0 | 25.0 | 25.0 | 25.0 | 25.0 |
| pH regulator | TEA | 0.5 | 0.5 | 0.5 | 0.5 | 0.5 | 0.5 | 0.5 | 0.5 |
| Water | Deionized water | 54.1 | 54.1 | 54.1 | 54.1 | 54.1 | 54.1 | 54.1 | 54.1 |
| Preservative | BIT | 0.2 | 0.2 | 0.2 | 0.2 | 0.2 | 0.2 | 0.2 | 0.2 |
| Corrosion Inhibitor | BTA | 0.1 | 0.1 | 0.1 | 0.1 | 0.1 | 0.1 | 0.1 | 0.1 |
| | Total | 100.0 | 100.0 | 100.0 | 100.0 | 100.0 | 100.0 | 100.0 | 100.0 |

TABLE 9

| | | Example | | | | |
|---|---|---|---|---|---|---|
| | Liquid type | 17 (2) | 18 (2) | 19 (2) | 20 (2) | 21 (2) |
| Pigment | C: PB15:4 | | | 5.0 | | |
| | M: PR122 | | | | 5.0 | |
| | Y: PY74 | | | | | 5.0 |
| | B: acidic CB | | | | | |
| | W: titanium dioxide | | | | | |
| Dye | C: Blue No. 1 | | | | | |
| | M: Red No. 3 | 5.0 | | | | |
| | Y: Yellow No. 4 | | 5.0 | | | |
| Surfactant | TEGO Wet270 | 0.1 | 0.1 | 0.1 | 0.1 | 0.1 |
| Water-soluble organic solvent | MBD | 10.0 | 10.0 | 20.0 | 20.0 | 10.0 |
| | EHD | 5.0 | 5.0 | 5.0 | 10.0 | 5.0 |
| | Glycerin | 25.0 | 25.0 | 25.0 | 25.0 | 23.0 |
| pH regulator | TEA | 0.5 | 0.5 | 0.5 | 0.5 | 0.5 |
| Water | Deionized water | 54.1 | 54.1 | 44.1 | 39.1 | 56.1 |
| Preservative | BIT | 0.2 | 0.2 | 0.2 | 0.2 | 0.2 |
| Corrosion inhibitor | BTA | 0.1 | 0.1 | 0.1 | 0.1 | 0.1 |
| | Total | 100.0 | 100.0 | 100.0 | 100.0 | 100.0 |

| | | Example | | | | |
|---|---|---|---|---|---|---|
| | Liquid type | 22 (2) | 23 (2) | 24 (2) | 25 (2) | 26 (2) |
| Pigment | C: PB15:4 | | | | | |
| | M: PR122 | | | | | |
| | Y: PY74 | | | | | |
| | B: acidic CB | 5.0 | | | | |
| | W: titanium dioxide | | 5.0 | | | |
| Dye | C: Blue No. 1 | | | 5.0 | | |
| | M: Red No. 3 | | | | 5.0 | |
| | Y: Yellow No. 4 | | | | | 5.0 |
| Surfactant | TEGO Wet270 | 0.1 | 0.1 | 0.1 | 0.1 | 0.1 |
| Water-soluble organic solvent | MBD | 10.0 | 10.0 | 10.0 | 10.0 | 10.0 |
| | EHD | 5.0 | 5.0 | 5.0 | 5.0 | 5.0 |
| | Glycerin | 25.0 | 25.0 | 25.0 | 25.0 | 25.0 |
| pH regulator | TEA | 0.5 | 0.5 | 0.5 | 0.5 | 0.5 |
| Water | Deionized water | 54.1 | 54.1 | 54.1 | 54.1 | 54.1 |

TABLE 9-continued

| | | | | | | |
|---|---|---|---|---|---|---|
| Preservative | BIT | 0.2 | 0.2 | 0.2 | 0.2 | 0.2 |
| Corrosion inhibitor | BTA | 0.1 | 0.1 | 0.1 | 0.1 | 0.1 |
| | Total | 100.0 | 100.0 | 100.0 | 100.0 | 100.0 |

TABLE 10

| | | Comparative Example | | | | | |
|---|---|---|---|---|---|---|---|
| | Liquid type | 1 (2) | 2 (2) | 3 (2) | 4 (2) | 5 (2) | 6 (2) |
| Pigment | C: PB15:4 | 5.0 | | | | | |
| | M: PR122 | | 5.0 | | | | |
| | Y: PY74 | | | 5.0 | | | |
| | B: acidic CB | | | | 5.0 | | |
| | W: titanium dioxide | | | | | 5.0 | |
| Dye | C: Blue No. 1 | | | | | | 5.0 |
| | M: Red No. 3 | | | | | | |
| | Y: Yellow No. 4 | | | | | | |
| Surfactant | TEGO Wet270 | 0.1 | 0.1 | 0.1 | 0.1 | 0.1 | 0.1 |
| Water-soluble organic solvent | MBD | 10.0 | 10.0 | 10.0 | 10.0 | 10.0 | 30.0 |
| | EHD | 5.0 | 5.0 | 5.0 | 5.0 | 5.0 | 25.0 |
| | Glycerin | 25.0 | 25.0 | 25.0 | 25.0 | 25.0 | 25.0 |
| pH regulator | TEA | 0.5 | 0.5 | 0.5 | 0.5 | 0.5 | 0.5 |
| Water | Deionized water | 54.1 | 54.1 | 54.1 | 54.1 | 54.1 | 14.1 |
| Preservative | BIT | 0.2 | 0.2 | 0.2 | 0.2 | 0.2 | 0.2 |
| Corrosion Inhibitor | BTA | 0.1 | 0.1 | 0.1 | 0.1 | 0.1 | 0.1 |
| | Total | 100.0 | 100.0 | 100.0 | 100.0 | 100.0 | 100.0 |

| | | Comparative Example | | | | |
|---|---|---|---|---|---|---|
| | Liquid type | 7 (2) | 8 (2) | 9 (2) | 10 (2) | 11 (2) |
| Pigment | C: PB15:4 | | | 5.0 | | |
| | M: PR122 | | | | 5.0 | 5.0 |
| | Y: PY74 | | | | | |
| | B: acidic CB | | | | | |
| | W: titanium dioxide | | | | | |
| Dye | C: Blue No. 1 | | | | | |
| | M: Red No. 3 | 5.0 | | | | |
| | Y: Yellow No. 4 | | 5.0 | | | |
| Surfactant | TEGO Wet270 | 0.1 | 0.1 | 0.1 | 0.1 | 0.1 |
| Water-soluble organic solvent | MBD | | | 10.0 | 10.0 | 10.0 |
| | EHD | 5.0 | 5.0 | 5.0 | 5.0 | 5.0 |
| | Glycerin | 25.0 | 5.0 | 25.0 | 25.0 | 25.0 |
| pH regulator | TEA | 0.5 | 0.5 | 0.5 | 0.5 | 0.5 |
| Water | Deionized water | 64.1 | 84.1 | 54.1 | 54.1 | 54.1 |
| Preservative | BIT | 0.2 | 0.2 | 0.2 | 0.2 | 0.2 |
| Corrosion Inhibitor | BTA | 0.1 | 0.1 | 0.1 | 0.1 | 0.1 |
| | Total | 100.0 | 100.0 | 100.0 | 100.0 | 100.0 |

Evaluation
Configuration of Device and Image Forming

The image forming device having a configuration illustrated in FIG. 1 or FIG. 2 was used in the following evaluation.

The first active energy curing composition (1) and the second active energy ray curing composition (3) were loaded in the image forming device including the inkjet head (MH5440, manufactured by Ricoh Co., Ltd.) as the discharging device. The image forming device used included a UV-LED (LED ZERO, wavelength of 395 nm, illuminance of 1.0 W/cm$^2$ at the exposed surface, manufactured by Integration Technology Japan). The image forming device further included a controller for controlling discharging, a composition container, and a supply path from the composition container to the inkjet head.

The composition (1) was discharged to form a film having a thickness of 10 µm on a procured PET film (COSMOS-HINE (registered) A4100, thickness of 188 µm, manufactured by TOYOBO CO., LTD.) for general purpose after the viscosity of the composition (1) was adjusted 10 to 12 mPa·s by the temperature adjustment (from 30 to 60 degrees C.) of the inkjet head.

The film of the composition (1) was exposed to UV by the UV-LED.

The ink (2) was then discharged onto the exposed film to form an image.

The composition (3) was further discharged from the inkjet depending on Examples, followed by exposure to UV by UV-LED to form an image. The viscosity of the composition (3) was also adjusted 10 to 12 mPa·s by the temperature adjustment (from 30 to 60 degrees C.).

The first active energy curing composition (1) discharged was subjected to exposure to UV by a UV-LED in Comparative Example 11 alone after the ink (2) was discharged.

Evaluation on Curability (Measuring of Cumulative Quantity of Exposure Light)

The image obtained was determined as cured if the film was free of tackiness when touched by a finger. The cumulative quantity of exposure light required for curing the image was calculated. A cumulative quantity of exposure light required for curing of 1.0 J/cm$^2$ or less was determined as practical.

Hardness

The pencil hardness of the image obtained as described above was measured according to scratch hardness (pencil method) according to JIS K5600-5-4 format by using the device and the instrument below. The pencil hardness HB or above was determined as practical.

Device and Instrument

Device: Pencil scratch hardness TQC WW tester (specialized for load of 750 g) (manufactured by COTEC Corporation)

Pencil: Set of pencils (Mitsubishi Pencil Co., Ltd.) made of wood for drawing having the following hardness 6B, 5B, 4B, 3B, 2B, B, HB, F, H, 2H, 3H, 4H, 5H, and 6H Pencil sharpener: Special device that scrapes off the wood part of a pencil alone while leaving the cylinder-like core of the pencil as was.

Ink having a poor curability does not cure sufficiently upon an application of the quantity of light mentioned above so that the hardness becomes low.

Measuring of Viscosity

The composition (1) and the composition (3) were subjected to measurements of viscosity by a cone plate rotatory viscometer (VISCOMETER TVE-22L, manufactured by TOKI SANGYO CO., LTD, and a cone rotor (1° 34)×R24) at 50 rpm and a temperature adjusted to 25 degrees C. for the hemathermal circulating water. VISCOMATE VM-150III was used for the temperature control of the circulating water.

Evaluation on Beading Quality (Uneven Density)

The composition (1) was discharged onto the PET film mentioned above followed by exposure to UV and thereafter the ink (2) was discharged thereto to form a solid image of cyan, magenta, yellow, black, and white. Beading (non-uniform density) on the solid image was visually checked and evaluated according to the following criteria.

Evaluation Criteria
S: Free of non-uniform density
A: Slight non-uniform density
C: Non-uniform density Abrasion Resistance (Fixability)

The image obtained was subjected to white cloth for color fastness testing for abrasion according to JIS LO849 format to evaluate the fixability. The transfer density to the cloth was scaled from one to five according to the following evaluation criteria. A larger number reads better.

Evaluation Criteria
5. Very little transfer
4. Slight transfer
3. Moderate transfer
2. Significant transfer
1. Much transfer

TABLE 11

| | Example | | | | | | | | | |
|---|---|---|---|---|---|---|---|---|---|---|
| | 1 | 2 | 3 | 4 | 5 | 6 | 7 | 8 | 9 | 10 |
| Liquid type | (1) | (1) | (1) | (1) | (1) | (1) | (1) | (1) | (1) | (1) |
| Cumulative quantity of exposure light required for curing (J/cm$^2$) | 0.4 | 0.4 | 0.5 | 0.4 | 0.6 | 0.5 | 0.6 | 0.4 | 0.4 | 0.5 |
| Pencil hardness | H | 2H | 2H | H | 2H | H | 3H | H | H | H |
| Viscosity (mPa·s) | 22.3 | 23.5 | 25.3 | 22.1 | 20.9 | 30.1 | 27.7 | 26.9 | 28.9 | 29.4 |
| Beading | S | S | S | S | S | S | S | S | S | S |
| Fixability | 5 | 5 | 5 | 5 | 5 | 4 | 5 | 4 | 5 | 4 |

| | Example | | | | | | | | | | | |
|---|---|---|---|---|---|---|---|---|---|---|---|---|
| | 11 | | 12 | | 13 | | 14 | | 15 | | 16 | |
| Liquid type | (1) | (3) | (1) | (3) | (1) | (3) | (1) | (3) | (1) | (3) | (1) | (3) |
| Cumulative quantity of exposure light required for curing (J/cm$^2$) | 0.4 | 0.4 | 0.5 | 0.4 | 0.6 | 0.5 | 0.6 | 0.4 | 0.4 | 0.5 | 0.9 | 0.9 |
| Pencil hardness | H | | 2H | | H | | 3H | | H | | H | |
| Viscosity (mPa·s) | 29.8 | 30.4 | 27.7 | 31.5 | 28.9 | 30.9 | 24.4 | 28.8 | 28.7 | 29.9 | 22.3 | 23.5 |
| Beading | S | | S | | S | | S | | S | | S | |
| Fixability | 5 | | 4 | | 5 | | 5 | | 4 | | 4 | |

TABLE 12

| | Example | | | | | | | | | |
|---|---|---|---|---|---|---|---|---|---|---|
| | 17 | | 18 | | 19 | | 20 | | 21 | |
| Liquid type | (1) | (3) | (1) | (3) | (1) | (3) | (1) | (3) | (1) | (3) |
| Cumulative quantity of exposure light required for curing (J/cm$^2$) | 0.9 | 0.8 | 0.7 | 0.7 | 0.6 | 0.8 | 0.6 | 0.5 | 0.5 | 0.9 |
| Pencil hardness | 2H | | H | | 3H | | H | | H | |
| Viscosity (mPa · s) | 25.3 | 22.1 | 20.9 | 23.5 | 29.8 | 2.9.0 | 30.5 | 29.2 | 29.8 | 30.4 |
| Beading | A | | S | | A | | S | | S | |
| Fixability | 5 | | 5 | | 4 | | 4 | | 5 | |

| | Example | | | | | | | | | |
|---|---|---|---|---|---|---|---|---|---|---|
| | 22 | | 23 | | 24 | | 25 | | 26 | |
| Liquid type | (1) | (3) | (1) | (3) | (1) | (3) | (1) | (3) | (1) | (3) |
| Cumulative quantity of exposure light required for curing (J/cm$^2$) | 0.7 | 0.6 | 0.8 | 0.9 | 0.6 | 0.7 | 0.8 | 0.6 | 0.4 | 0.3 |
| Pencil hardness | 2H | | H | | 3H | | H | | H | |
| Viscosity (mPa · s) | 27.7 | 31.5 | 28.9 | 30.9 | 24.4 | 28.8 | 28.7 | 29.9 | 21.7 | 20.9 |
| Beading | A | | A | | A | | A | | A | |
| Fixability | 4 | | 4 | | 5 | | 5 | | 5 | |

TABLE 13

| | Comparative Example | | | | | | |
|---|---|---|---|---|---|---|---|
| | 1 | 2 | 3 | 4 | 5 | 6 | |
| Liquid type | (1) | (1) | (1) | (1) | (1) | (1) | (3) |
| Cumulative quantity of exposure light required for curing (J/cm$^2$) | *1 | *1 | *1 | 5.4 | 5.8 | *1 | *1 |
| Pencil hardness | — | — | — | 6B | 6B | — | |
| Viscosity (mPa · s) | 22.2 | 22.5 | 28.9 | 68.0 | 109.2 | 19.8 | 10.4 |
| Beading | C | C | C | C | C | C | |
| Fixability | 1 | 1 | 1 | 2 | 2 | 1 | |

| | Comparative Example | | | | | | | | |
|---|---|---|---|---|---|---|---|---|---|
| | 7 | | 8 | | 9 | | 10 | | 11 |
| Liquid type | (1) | (3) | (1) | (3) | (1) | (3) | (1) | (3) | (1) |
| Cumulative quantity of exposure light required for curing (J/cm$^2$) | *1 | *1 | 7.0 | 7.7 | *1 | 1.5 | *1 | *1 | *1 |
| Pencil hardness | — | | 5B | | 6B | | — | | — |
| Viscosity (mPa · s) | 7.9 | 8.0 | 240.3 | 209.1 | 15.1 | 10.6 | 11.0 | 8.9 | 22.2 |
| Beading | C | | C | | C | | C | | C |
| Fixabiiity | 1 | | 2 | | 1 | | 1 | | 1 |

Since the cumulative quantity of exposure light required for curing (J/cm$^2$) and viscosity in Tables 11 to 13 were measured individually for the composition (1) and the composition (3), the liquid types are shown in corresponding columns "*1" in Table 13 means that the image did not cure when the cumulative quantity of exposure light reached 10 J/cm$^2$. The pencil hardness "–" in Table 13 means not measurable.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:
1. An image forming device, comprising:
a first discharging device containing a first active energy curing composition (1) containing a first (meth)acrylic amide compound (A) having a (meth)acrylic group and a first polymerization initiator (C), the first discharging device configured to discharge the first active energy curing composition (1) to a medium;

a first exposing device configured to expose the first active energy curing composition (1) applied to the medium to first active energy; and a second discharging device containing an ink (2) containing a coloring material, a water-soluble organic solvent, and water, the second discharging device configured to discharge the ink (2) to the first active energy curing composition (1) exposed to the first active energy;

wherein the first (meth)acrylamide compound (A) comprises an acrylic amide compound (A1) represented by the following Chemical Formula (1) or Chemical Formula (2),

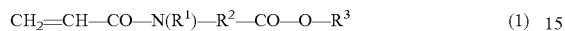

$$CH_2=CH-CO-N(R^1)-R^2-CO-O-R^3 \quad (1)$$

wherein $R^1$ represents a hydrogen atom or a linear or branched alkyl group having 1 to 4 carbon atoms, $R^2$ represents a linear or branched alkylene group having 1 to 4 carbon atoms, and $R^3$ represents a linear or branched alkyl group having 1 to 4 carbon atoms, where a number of the carbon atoms in $R^1$, $R^2$, and $R^3$ is 2 to 6 in total, Chemical Formula (2)

$$CH_2=CH-CO-N\underset{\underset{X}{\diagdown\diagup}}{\diagup\diagdown}-R^4-CO-O-R^5$$

wherein, the ring X represents a ring structure having a nitrogen atom and two to five carbon atoms, $R^4$ represents a single bond or a linear or branched alkylene group having one to three carbon atoms, and $R^5$ represents a linear or branched alkyl group having one to three carbon atoms, where a number of the carbon atoms in the ring X, $R^4$, and $R^5$ is 3 to 6 in total.

2. The image forming device according to claim 1, wherein the first active energy curing composition (1) further comprises a first polyfunctional polymerizable compound or polymerizable oligomer (B).

3. The image forming device according to claim 1, further comprising:

a third discharging device containing a second active energy curing composition (3) containing a second (meth)acrylamide compound (A), a second polyfunctional polymerizable compound or polymerizable oligomer (B), and a second polymerization initiator (C), the third discharging device configured to discharge the second active energy curing composition (3) onto the ink (2) discharged; and a second exposing device configured to expose the second active energy curing composition (3) discharged to second active energy.

4. The image forming device according to claim 1, further comprising a conveying device configured to convey the medium in a conveyance direction, wherein the first discharging device, the first exposing device, and the second discharging device are disposed in this order from upstream to downstream along the conveyance direction of the medium.

5. The image forming device according to claim 3, further comprising a conveying device configured to convey the medium in a conveyance direction, wherein the first discharging device, the first exposing device, the second discharging device, the third discharging device, and the second exposing device are disposed in this order from upstream to downstream along the conveyance direction of the medium.

6. The image forming device according to claim 1, further comprising a carriage member configured to scan the medium, the carriage member carrying the first discharging device, the first exposing device, and the second discharging device.

7. The image forming device according to claim 6, further comprising a third discharging device containing a second active energy curing composition (3) containing a second (meth)acrylamide compound (A), a second polyfunctional polymerizable compound or polymerizable oligomer (B), and a second polymerization initiator (C), the third discharging device configured to discharge the second active energy curing composition (3), wherein the carriage member carries the third discharging device.

8. The image forming device according to claim 6, further comprising a jig configured to fix a finger having a nail, wherein the medium is the nail.

9. The image forming device according to claim 6, further comprising a polishing device configured to polish a surface of the medium.

10. The image forming device according to claim 9, wherein the first discharging device discharges the first active energy curing composition (1) to the medium when a surface of the medium has a smoothness of a threshold or greater or after the polishing device polishes the surface to the threshold or greater when the surface of the medium has a smoothness less than the threshold.

11. The image forming device according to claim 10, wherein the first discharging device and the first exposing device respectively repeat discharging the first active energy curing composition (1) and exposing the first active energy curing composition (1) to the first active energy until the surface has a smoothness of the threshold or greater.

12. The image forming device according to claim 1, further comprising:

an imaging device configured to detect the smoothness of the surface of the medium.

13. The image forming device according to claim 6, further comprising:

an image acquisition device configured to acquire an image of the first active energy curing composition (1) exposed to the first active energy to obtain information on the image; and a temperature detector configured to detect a temperature of the image in a non-contact manner, wherein whether the second discharging device discharges the ink (2) is determined depending on at least one of the information or the temperature.

14. The image forming device according to claim 3, wherein at least one of the first active energy curing composition (1) or the second active energy curing composition (3) further respectively comprises a first hydrogen donor (D) or a second hydrogen donor (D).

15. The image forming device according to claim 1, wherein the first active energy comprises ultraviolet having a peak in a range of wavelength of from 365 to 405 nm.

16. The image forming device according to claim 1, wherein the first active energy has a quantity of exposure light of from 10 to 500 mJ/cm$^2$.

17. An image forming method, comprising:
discharging a first active energy curing composition (1) containing a first (meth)acrylic amide compound (A) having a (meth)acrylic group and a first polymerization initiator (C) to a medium;
exposing the first active energy curing composition (1) applied to the medium to first active energy; and
discharging an ink (2) containing a coloring material, a water-soluble organic solvent, and water to the first active energy curing composition (1) exposed to the first active energy;
wherein the first (meth)acrylamide compound (A) comprises an acrylic amide compound (A1) represented by the following Chemical Formula (1) or Chemical Formula (2),

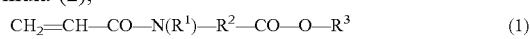  (1)

wherein $R^1$ represents a hydrogen atom or a linear or branched alkyl group having 1 to 4 carbon atoms, $R^2$ represents a linear or branched alkylene group having 1 to 4 carbon atoms, and $R^3$ represents a linear or branched alkyl group having 1 to 4 carbon atoms, where a number of the carbon atoms in $R^1$, $R^2$, and $R^3$ is 2 to 6 in total,

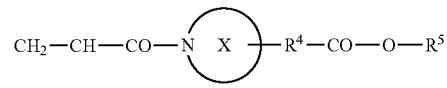  (2)

wherein, the ring X represents a ring structure having a nitrogen atom and two to five carbon atoms, $R^4$ represents a single bond or a linear or branched alkylene group having one to three carbon atoms, and $R^5$ represents a linear or branched alkyl group having one to three carbon atoms, where a number of the carbon atoms in the ring X, $R^4$, and $R^5$ is 3 to 6 in total.

18. The image forming device according to claim 1,
wherein a content of the second (meth)acrylamide compound (A) in an entire of the first active energy curing composition (1) is from 40 to 60 percent by mass.

19. The image forming device according to claim 1,
wherein the first active energy curing composition (1) has a viscosity of 20.9 to 30.5 at 23 degrees C.

* * * * *